US010545709B2

(12) United States Patent
Inoue

(10) Patent No.: US 10,545,709 B2
(45) Date of Patent: Jan. 28, 2020

(54) IMAGE PROCESSING APPARATUS CAPABLE OF DISPLAYING HISTORY OF SETTING DETERMINED FOR EXECUTING JOB AND METHOD FOR CONTROLLING IMAGE PROCESSING APPARATUS

(71) Applicant: CANON KABUSHIKI KAISHA, Tokyo (JP)

(72) Inventor: Kenta Inoue, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/881,585

(22) Filed: Jan. 26, 2018

(65) Prior Publication Data

US 2018/0217797 A1 Aug. 2, 2018

(30) Foreign Application Priority Data

Jan. 31, 2017 (JP) ................................. 2017-016098

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC .......... *G06F 3/1273* (2013.01); *G06F 3/1203* (2013.01); *G06F 3/1274* (2013.01); *H04N 1/00474* (2013.01); *H04N 1/00477* (2013.01); *H04N 1/00482* (2013.01)

(58) Field of Classification Search
CPC .... G06F 3/1273; G06F 3/1203; G06F 3/1274; H04N 1/00474; H04N 1/00477; H04N 1/00482

USPC ................................ 358/1.1, 1.15, 1.13, 1.14
See application file for complete search history.

(56) References Cited

U.S. PATENT DOCUMENTS

| 6,750,890 | B1 | 6/2004 | Sugimoto | |
|---|---|---|---|---|
| 2004/0170443 | A1 | 9/2004 | Maeshima | |
| 2005/0111866 | A1 | 5/2005 | Sato | |
| 2007/0091341 | A1 | 4/2007 | Yamada | |
| 2010/0031192 | A1 | 2/2010 | Kong | |
| 2011/0090533 | A1* | 4/2011 | Shimizu | G06F 3/1222 358/1.15 |
| 2011/0161967 | A1 | 6/2011 | Horiyama | |
| 2016/0283827 | A1* | 9/2016 | Sano | G06K 15/1802 |
| 2016/0364183 | A1* | 12/2016 | Saito | G06F 3/1222 |

(Continued)

FOREIGN PATENT DOCUMENTS

| CN | 104917919 A | 9/2015 |
|---|---|---|
| CN | 104917922 A | 9/2015 |
| JP | 2013106102 A | 5/2013 |

*Primary Examiner* — Douglas Q Tran
(74) *Attorney, Agent, or Firm* — Canon U.S.A., Inc. IP Division

(57) ABSTRACT

There is provided a method for controlling an image processing apparatus, including storing histories of a predetermined number of jobs in a storage unit, displaying the histories of the jobs stored in the storing, performing control to, in a case where the histories of the predetermined number of jobs are stored in the storage unit, delete, from the storage unit, one of the histories of the jobs stored in the storage unit in accordance with execution of a job and store a history of the executed job in the storage unit, and making settings in such a manner that a history of a job selected by a user is not deleted from the storage unit under the control.

16 Claims, 26 Drawing Sheets

(56) References Cited

U.S. PATENT DOCUMENTS

2017/0142269 A1\* 5/2017 Maeda ............... H04N 1/00514
2017/0249642 A1\* 8/2017 Burpulis ................ G06Q 10/10

\* cited by examiner

FIG. 8A 800

| TYPE | SETTING VALUES ||||||||
|---|---|---|---|---|---|---|---|---|
| | NUMBER OF COPIES | SELECT COLOR | SELECT SHEET | COMBINE PAGES | DOUBLE-SIDED | SPREAD TWO PAGES | MAGNIFICATION | etc... |
| DEFAULT SETTINGS (802) | ONE COPY | BLACK AND WHITE | AUTO | 1 in 1 | SINGLE-SIDED | OFF | 100% | ... |
| CURRENT SETTINGS (803) | TWO COPIES | COLOR | AUTO | 1 in 1 | DOUBLE-SIDED | OFF | 100% | ... |

| TYPE | SETTING VALUES ||||||||
|---|---|---|---|---|---|---|---|---|
| | NUMBER OF COPIES | SELECT COLOR | SELECT SHEET | COMBINE PAGES | DOUBLE-SIDED | SPREAD TWO PAGES | MAGNIFICATION | etc... |
| DEFAULT SETTINGS | ONE COPY | BLACK AND WHITE | AUTO | 1 in 1 | SINGLE-SIDED | OFF | 100% | ... |
| CURRENT SETTINGS | FIVE COPIES | COLOR | AUTO | 1 in 1 | DOUBLE-SIDED | OFF | 100% | ... |

| TYPE | SETTING VALUE ||||||||
|---|---|---|---|---|---|---|---|---|
| | ADDRESS | NUMBER OF ADDRESSES | DOUBLE-SIDED DOCUMENT | READ SIZE | MIXED DOCUMENT SIZES | FILE FORMAT | SELECT COLOR | RESOLUTION | etc... |
| DEFAULT SETTINGS (1402) | — | — | — | — | — | PDF | AUTO (COLOR/BLACK AND WHITE) | 600 dpi | ... |
| CURRENT SETTINGS (1403) | inoue@xxxxxxxxx.co.jp | ONE ADDRESS | — | A4 | — | PDF | AUTO (COLOR/GRAY) | 300 dpi | ... |

1401

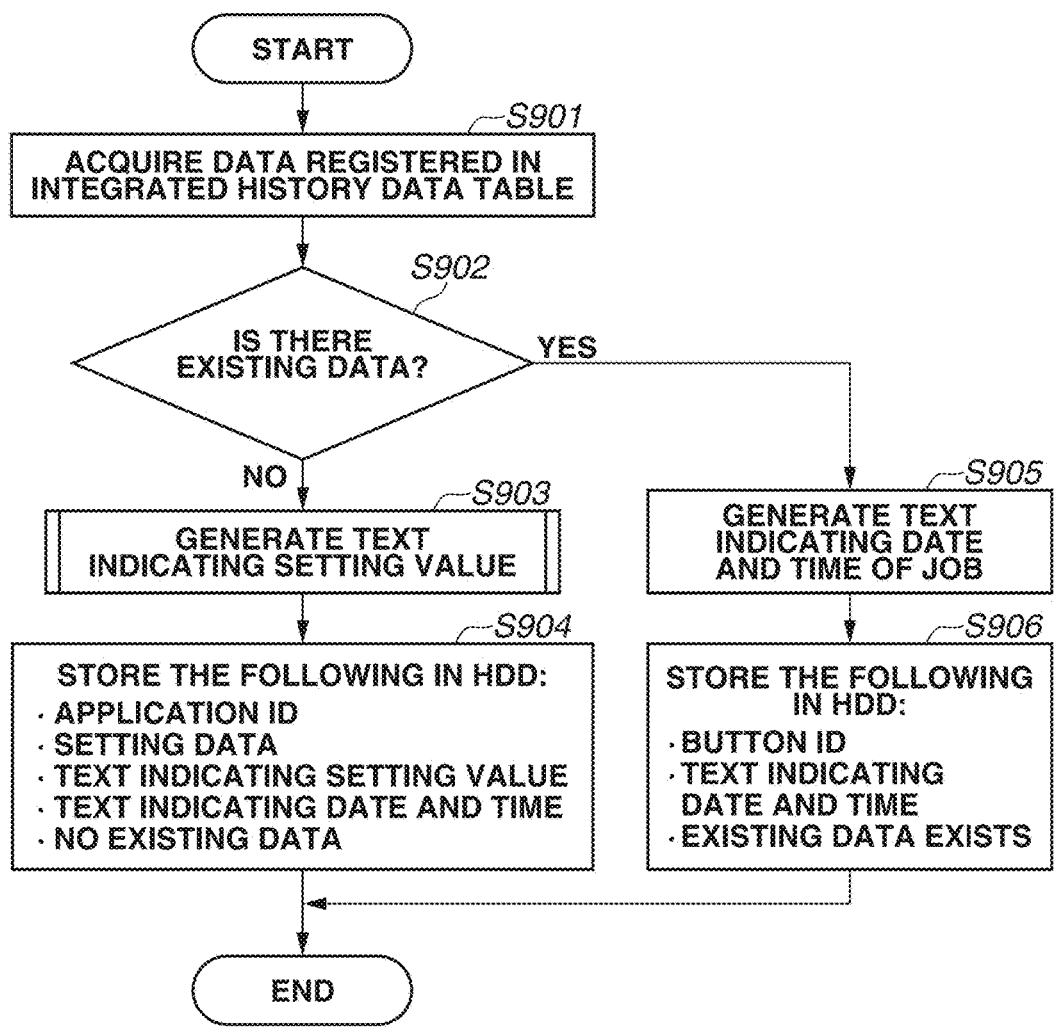

| BUTTON ID | APPLICATION ID | DATA | DISPLAY TEXT | |
|---|---|---|---|---|
| | | | DATE AND TIME | SETTING VALUES |
| | | | | |
| | | | | |
| | | | | |
| | | | | |
| | | | | |
| | | | | |
| | | | | |

FIG.10B

| BUTTON ID | APPLICATION ID | DATA | DISPLAY TEXT | |
|---|---|---|---|---|
| | | | DATE AND TIME | SETTING VALUES |
| 1001 | 101 | data1.xml | 2016/12/15 13:01:22 | TWO COPIES, COLOR, DOUBLE-SIDED |
| | | | | |
| | | | | |
| | | | | |
| | | | | |
| | | | | |
| | | | | |

FIG.10C

| BUTTON ID | APPLICATION ID | DATA | DISPLAY TEXT | |
|---|---|---|---|---|
| | | | DATE AND TIME | SETTING VALUES |
| 1001 | 101 | data1.xml | 2016/12/15 13:01:22 | TWO COPIES, COLOR, DOUBLE-SIDED |
| 1002 | 101 | data2.xml | 2016/12/16 15:38:16 | FIVE COPIES, COLOR, DOUBLE-SIDED |
| | | | | |
| | | | | |
| | | | | |
| | | | | |

FIG.10D

| BUTTON ID | APPLICATION ID | DATA | DISPLAY TEXT ||
|---|---|---|---|---|
| | | | DATE AND TIME | SETTING VALUES |
| 1001 | 101 | data1.xml | 2016/12/15 13:01:22 | TWO COPIES, COLOR, DOUBLE-SIDED |
| 1002 | 101 | data2.xml | 2016/12/16 15:38:16 | FIVE COPIES, COLOR, DOUBLE-SIDED |
| 1003 | 201 | data3.xml | 2016/12/17 08:25:43 | inoue@xxxxxxxxx.co.jp, ONE ADDRESS, A4, AUTO (COLOR/GRAY) |
| | | | | |
| | | | | |
| | | | | |

FIG.10E

| BUTTON ID | APPLICATION ID | DATA | DISPLAY TEXT ||
|---|---|---|---|---|
| | | | DATE AND TIME | SETTING VALUES |
| 1001 | 101 | data1.xml | 2016/12/18 12:54:30 | TWO COPIES, COLOR, DOUBLE-SIDED |
| 1002 | 101 | data2.xml | 2016/12/16 15:38:16 | FIVE COPIES, COLOR, DOUBLE-SIDED |
| 1003 | 201 | data3.xml | 2016/12/17 08:25:43 | inoue@xxxxxxxxx.co.jp, ONE ADDRESS, A4, AUTO (COLOR/GRAY) |
| | | | | |
| | | | | |
| | | | | |

FIG.14A

| ORDER | BUTTON ID | PINNING |
|---|---|---|
| 1 | 1001 | OFF |
| 2 | 1003 | OFF |
| 3 | 1002 | OFF |
| 4 | | |
| 5 | | |
| 6 | | |
| 7 | | |
| 8 | | |
| 9 | | |
| 10 | | |

FIG.14B

| ORDER | BUTTON ID | PINNING |
|---|---|---|
| 1 | 1002 | ON |
| 2 | 1001 | OFF |
| 3 | 1003 | OFF |
| 4 | | |
| 5 | | |
| 6 | | |
| 7 | | |
| 8 | | |
| 9 | | |
| 10 | | |

FIG.18

| INTEGRATED HISTORY |
|---|
| 2016/12/18 12:54:30<br>ONE COPY, AUTO COLOR,<br>SINGLE-SIDED — 1901 |
| 2016/12/17 10:23:39<br>TWO COPIES, COLOR, SINGLE-SIDED,<br>MIXED DOCUMENTS > SAME WIDTH — 1903 |
| 2016/12/16 15:38:16<br>FIVE COPIES, BLACK AND WHITE,<br>DOUBLE-SIDED, 2 in 1 — 1904 |
| 2016/12/15 17:02:11<br>ONE COPY, AUTO COLOR,<br>SINGLE-SIDED, STAPLED — 1905 |

| BUTTON ID | APPLICATION ID | DATA | NAME | COMMENT |
|---|---|---|---|---|
| 1901 | 101 | data1.klm | CONTRACT | |
| 1902 | 101 | data2.xlm | REQUEST FORM | |
| 1903 | 101 | data3.xlm | | |
| | | | | |
| | | | | |
| | | | | |
| | | | | |
| | | | | |
| | | | | |
| | | | | |

FIG.21B

| BUTTON ID | APPLICATION ID | DATA | NAME | COMMENT |
|---|---|---|---|---|
| 1901 | 101 | data1.klm | CONTRACT | |
| 1902 | 101 | data2.xlm | REQUEST FORM | |
| 1903 | 101 | data3.xlm | FOR REGULAR MEETING | FIVE COPIES, COLOR, DOUBLE-SIDED |
| | | | | |
| | | | | |
| | | | | |
| | | | | |
| | | | | |
| | | | | |
| | | | | |

IMAGE PROCESSING APPARATUS CAPABLE OF DISPLAYING HISTORY OF SETTING DETERMINED FOR EXECUTING JOB AND METHOD FOR CONTROLLING IMAGE PROCESSING APPARATUS

BACKGROUND OF THE INVENTION

Field of the Invention

The present invention relates to an image processing apparatus, a method for controlling an image processing apparatus, and etc.

Description of the Related Art

There is known an image processing apparatus that stores, as a job history, settings and execution date and time of a job when executing the job. With the job histories displayed as a list on a display unit of the image processing apparatus, a user can check the types of jobs executed in the past, execution date and time of the jobs, and settings at the time of job execution (see Japanese Patent Application Laid-Open No. 2013-106102).

However, the number of job histories that can be displayed on the display unit of the image processing apparatus is limited. Therefore, when the number of job histories displayed on the display unit has reached the upper limit, display of one job history that has already been displayed has to be deleted in order to display a new job history. For example, when an eleventh job is executed in an image processing apparatus capable of displaying ten job histories, display of the job history with the oldest execution date and time of the job among the ten setting histories is deleted. Then, the history of the eleventh job that has been newly executed is displayed. As a result, when a user attempts to check the history of a job, the history of that job may not be displayed on the display unit.

SUMMARY OF THE INVENTION

According to an aspect of the present invention, a method for controlling an image processing apparatus, including storing histories of a predetermined number of jobs in a storage unit, displaying the histories of the jobs stored in the storing, performing control to, in a case where the histories of the predetermined number of jobs are stored in the storage unit, delete, from the storage unit, one of the histories of the jobs stored in the storage unit in response to execution of a job and store a history of the executed job in the storage unit, and making settings in such a manner that a history of a job selected by a user is not deleted from the storage unit under the control.

Further features of the present invention will become apparent from the following description of exemplary embodiments with reference to the attached drawings.

BRIEF DESCRIPTION OF THE DRAWINGS

FIGS. 8A, 8B, and 8C are schematic diagrams illustrating an example data table for storing default settings and settings at the time of job execution for each function.

FIG. 9 is a flowchart illustrating processing for determining contents to be registered in a data table for managing an integrated history according to the first exemplary embodiment.

FIGS. 10A, 10B, 10C, 10D, and 10E are diagrams illustrating an exemplary integrated history data table stored in a hard disk drive (HDD) for displaying the integrated history according to the first exemplary embodiment.

FIGS. 14A and 14B are diagrams illustrating a data table for managing the order of setting histories and ON/OFF of pinning displayed in the integrated history according to the first exemplary embodiment.

FIG. 18 is a schematic diagram illustrating an integrated history in a case where setting values of predetermined setting items are displayed in a setting history according to other exemplary embodiments.

FIGS. 21A and 21B are diagrams illustrating an example data table for managing information registered as custom buttons according to the other exemplary embodiments.

DESCRIPTION OF THE EMBODIMENTS

Hereinafter, exemplary embodiments of the present invention will be described in detail with reference to the accompanying drawings. Note that the following exemplary embodiments are not intended to limit the present invention according to the claims. Furthermore, not all combinations of features described in the present exemplary embodiments are necessarily essential to the solution of the present invention. Each of the embodiments of the present invention described below can be implemented solely or as a combination of a plurality of the embodiments or features thereof where necessary or where the combination of elements or features from individual embodiments in a single embodiment is beneficial.

Figure 1:
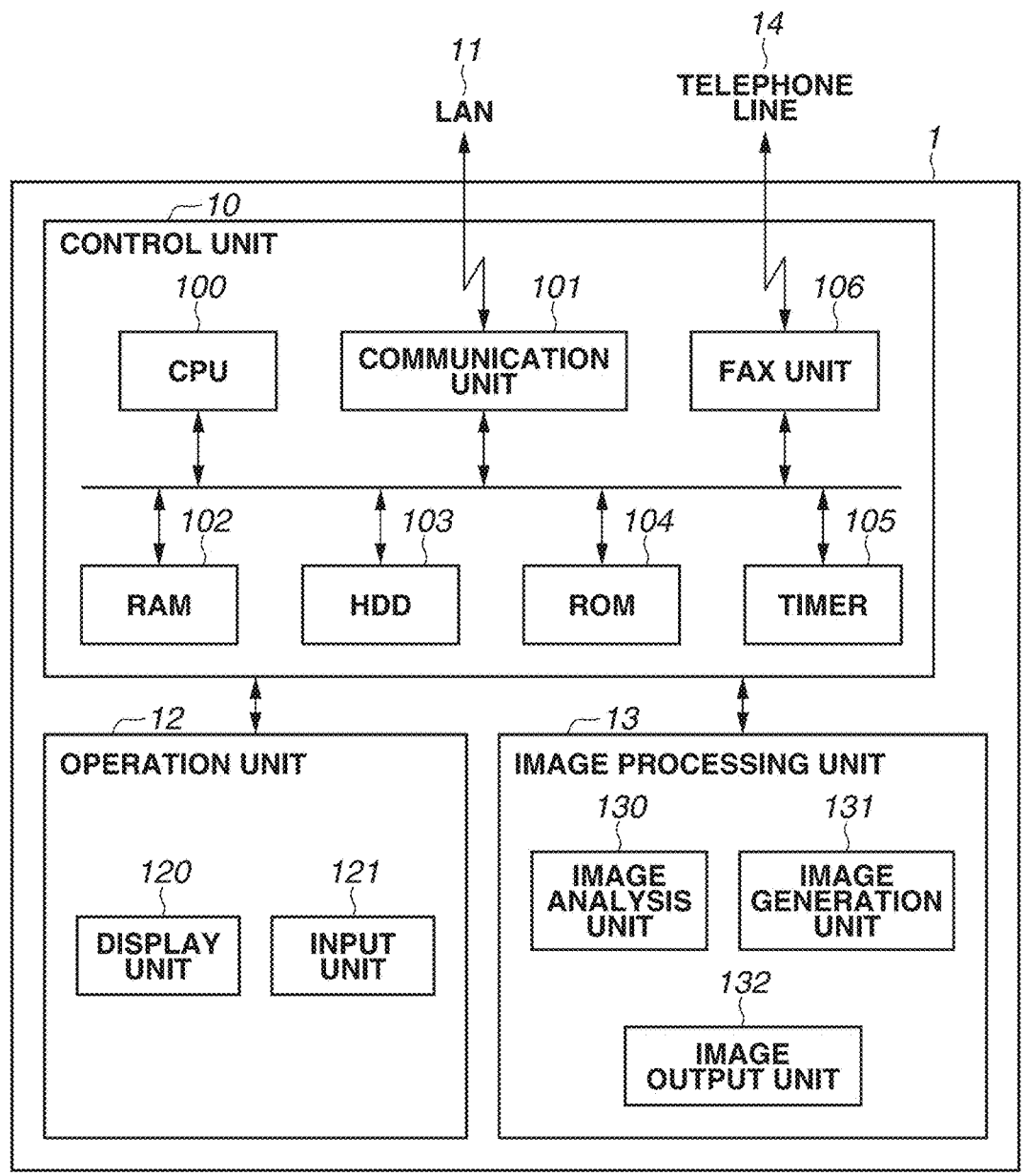
FIG. 1 is a block diagram illustrating a configuration of an image processing apparatus according to a first exemplary embodiment.

FIG. 1 is a block diagram illustrating a configuration of an image processing apparatus 1 according to a first exemplary embodiment of the present invention.

A control unit 10 controls the operation of each unit of the image processing apparatus 1. The control unit 10 includes a central processing unit (CPU) 100, a communication unit 101, a random access memory (RAM) 102, a hard disk drive (HDD) 103, a read only memory (ROM) 104, a timer 105, and a facsimile (FAX) unit 106. The CPU 100 controls the entire control unit 10. The image processing apparatus 1 is connected to the Internet via a local area network (LAN) 11. The communication unit 101 transmits and receives data via the LAN 11. The RAM 102 provides a system work memory for the CPU 100 to operate. The HDD 103 stores programs, document data, and setting data for operating the image processing apparatus 1. The HDD 103 may be a storage medium such as a magnetic disk, an optical medium, or a flash memory. The HDD 103 may not be present inside the image processing apparatus 1. For example, the image processing apparatus 1 may use, as a storage medium, an external server or a personal computer (PC) connected via the communication unit 101. The ROM 104 is a boot ROM and stores a boot program of the system. The CPU 100 loads a program, installed in the HDD 103, into the RAM 102 and performs various control based on the program. The timer 105 measures time according to an instruction of the CPU 100, and notifies the CPU 100 when the instructed time has elapsed. The FAX unit 106 transmits and receives fax data via a telephone line 14.

An operation unit 12 is controlled by the control unit 10, and includes a display unit 120 and an input unit 121. The display unit 120 is a display for displaying information about the image processing apparatus 1 to a user. The input unit 121 receives input from the user through interfaces such as a touch panel, a mouse, a camera, voice input, and a keyboard.

An image processing unit 13 is controlled by the control unit 10, and includes an image analysis unit 130, an image generation unit 131, and an image output unit 132. The image analysis unit 130 analyzes the structure of a document image and extracts required information from the analysis result. The image generation unit 131 reads (e.g., scans) a document, then digitizes an image of the document and generates image data, and stores the image data in the HDD 103. The image generation unit 131 can also generate document image data of another format using the information analyzed by the image analysis unit 130. The image output unit 132 outputs the image data stored in the HDD 103 or the like. For example, the image output unit 132 prints the image data on a sheet, transmits the image data to an external device, a server, or the like connected via the communication unit 101, or stores the image data in a storage medium connected to the image processing apparatus 1.

Figure 2:
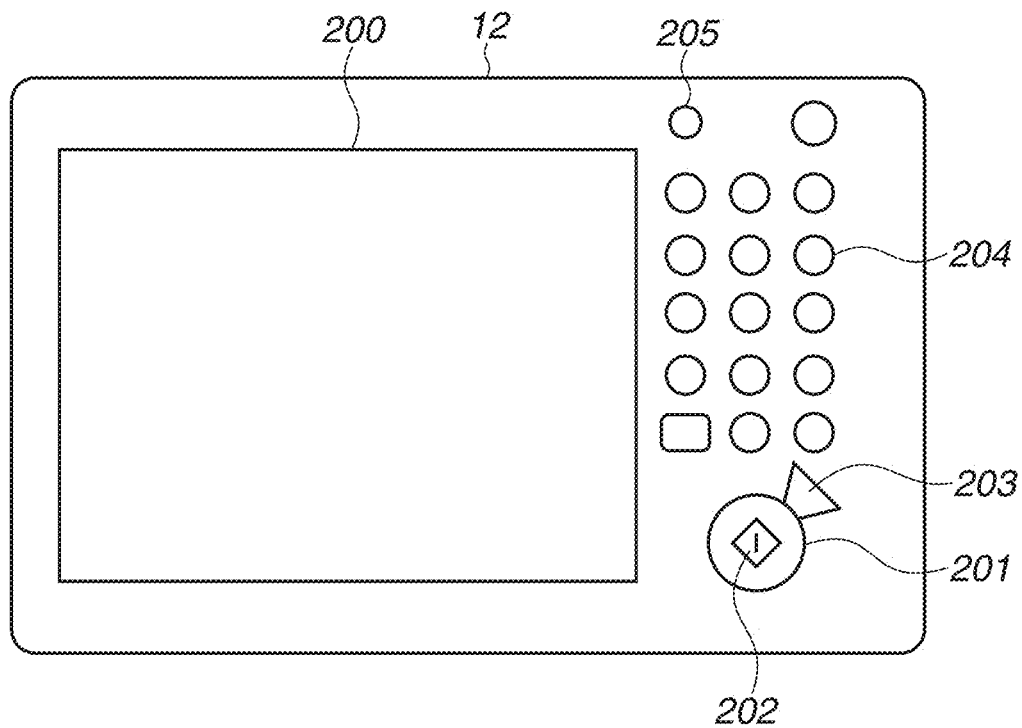
FIG. 2 is a diagram illustrating an appearance of an operation unit of the image processing apparatus according to the first exemplary embodiment.

FIG. 2 is an overview of the operation unit 12 according to the present exemplary embodiment.

A touch panel 200 is a liquid crystal display unit on which a touch panel sheet is stuck. The touch panel 200 displays an operation screen and a software key, and notifies the CPU 100 of position information of a displayed key that has been pressed. Therefore, the touch panel 200 in the present exemplary embodiment functions as both the display unit 120 and the input unit 121 in FIG. 1.

Next, various keys and buttons operated by the user will be described. A start key 201 is used, for example, to instruct the start of a document reading operation. A light emitting diode (LED) 202 to be lit in two colors of green and red is provided in the center of the start key 201, and indicates, depending on the color, whether the start key 201 is ready for use. While the LED 202 is lit in green, the image processing apparatus 1 can start a job upon detecting the pressing of the start key 201. While the LED 202 is lit in red, on the other hand, the image processing apparatus 1 cannot start a job. A stop key 203 is for stopping the processing being performed by the image processing apparatus 1. A numeric keypad 204 includes buttons of numbers and letters, and is used to instruct, for example, the setting of the number of copies and switching of screens on the touch panel 200. A user mode key 205 is pressed when the image processing apparatus 1 is to be set.

In the present specification, the CPU 100 calls up, from the HDD 103 or RAM 102, screen data and a corresponding screen control program and displays the screen data on the display unit 120. This operation of the CPU 100 is referred to as "displaying a screen".

First, a home screen and an integrated history for displaying setting histories of jobs, which are displayed on the display unit 120 of the image processing apparatus 1, will be described with reference to FIGS. 5A to 5H. Furthermore, with reference to FIGS. 10A to 10E and FIGS. 14A and 14B, description will be given about a data table for managing the display contents and display order of the setting histories displayed in an integrated history 509 on the home screen.

Figure 5A:
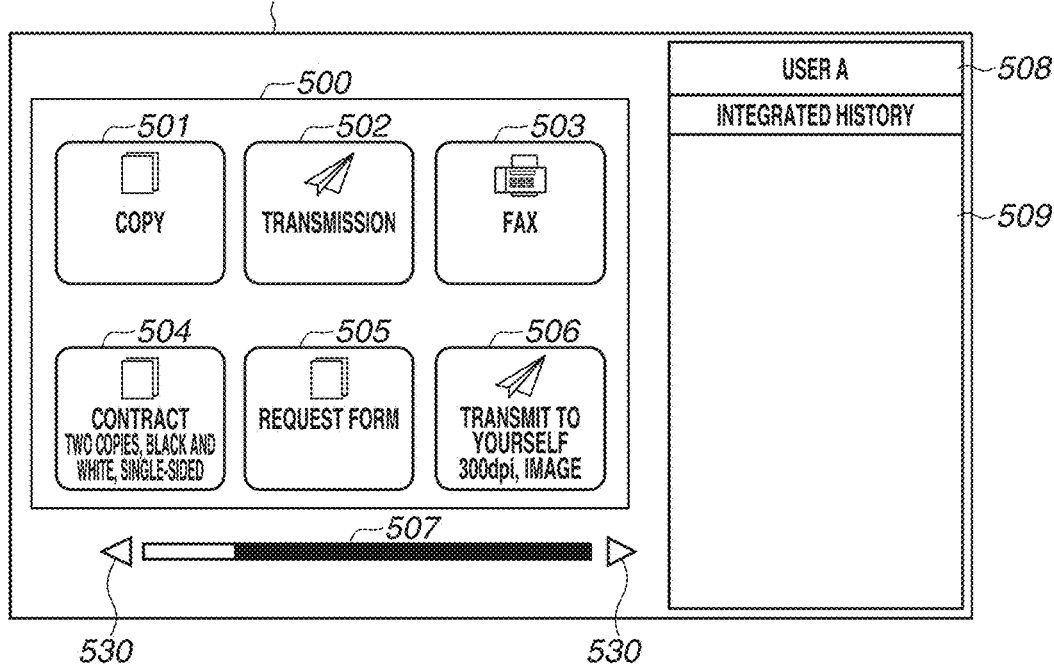
FIGS. 5A to 5H are diagrams illustrating an example home screen displayed on the touch panel of the image processing apparatus according to the first exemplary embodiment.

FIG. 5A illustrates a home screen displayed when a user A logs into the image processing apparatus 1. A username of the current logged-in user is displayed in an area 508.

A menu 500 that displays buttons for starting respective applications is displayed on the home screen. Application buttons 501 to 503 for starting applications, in which default setting values are set, are displayed in the menu 500. Custom buttons 504 to 506 for starting applications, in which setting values registered by the user in advance are set, are further displayed in the menu 500. The custom buttons 504 to 506 include a "My button" displayed only on the home screen of the logged-in user, and a shared button displayed on the home screen even when another user logs in. The user can decide whether each custom button is set as the My button or the shared button with a method not illustrated.

The layout of the application buttons 501 to 503 and the custom buttons 504 to 506 is set by the logged-in user with a method not illustrated.

A slider bar 507 is used to change the area displayed on the display unit 120 by sliding the menu 500 left and right. When the user moves the slider bar 507 left and right, presses an arrow button 530, or performs a flick operation in the display area of the menu 500, and the like, a hidden area of the menu 500 is displayed on the display unit 120.

The integrated history 509 constitutes an area for displaying the setting histories of jobs having executed by the image processing apparatus 1. In the integrated history 509, the setting histories of the executed jobs are displayed in reverse chronological order of the execution time irrespective of the type of the job. FIG. 5A illustrates a state in which the image processing apparatus 1 has executed no job or has deleted all the setting histories of the jobs displayed in the integrated history 509. If the image processing apparatus 1 has turned on the authentication function, only the setting histories of the jobs executed by the logged-in user in the past are displayed in the integrated history 509. The number of setting histories that can be displayed in the integrated history 509 is determined in advance. After the number of displayed setting histories reaches the upper limit of the number of setting histories that can be displayed in the integrated history 509, the setting history with the oldest job execution date and time is deleted, and instead, the setting history with the latest job execution date and time is displayed.

Figure 5B:
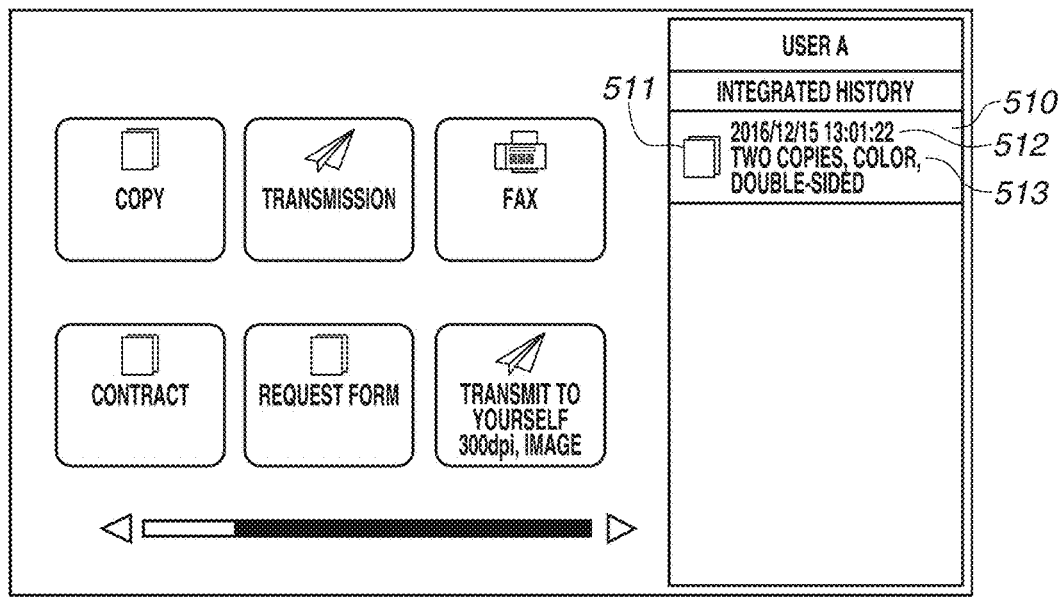

FIG. 5B illustrates a home screen displayed after the user A executes a copy job in the state of FIG. 5A. In FIG. 5B, a setting history 510 is displayed. The setting history 510 includes an application icon 511 indicating the type of a job, text 512 indicating the execution date and time of the job, and text 513 indicating the setting values of setting items that have been changed from the default settings. For example, the setting history 510 is a setting history of a copy application, and indicates that the job has been executed after the settings have been changed from the default setting values to the number of copies being two, color printing, and double-sided printing. Upon detecting that the setting history 510 has been pressed, the image processing apparatus 1 starts the application in a state in which the setting values stored in association with the setting history 510 are set.

Figure 5C:
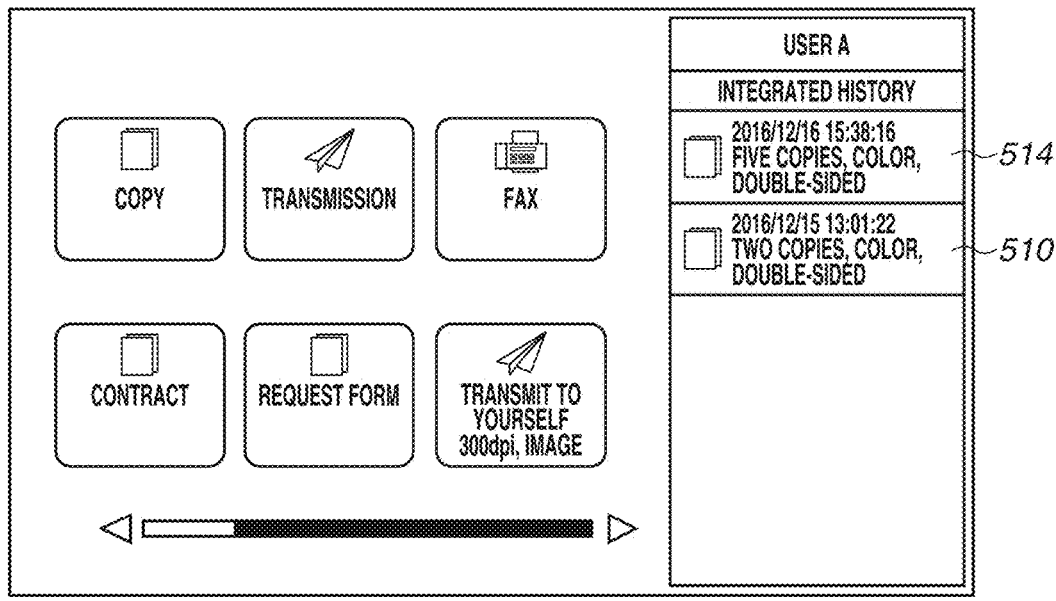

FIG. 5C illustrates a home screen displayed after a copy job is executed with settings different from the setting history 510 in the state of FIG. 5B. The setting history 510 and a setting history 514 are rearranged and displayed in descending order (reverse chronological order) of the execution date and time of the job. Here, since the setting history 510 is a history older than the setting history 514, the setting history 510 is displayed below the setting history 514.

Figure 5D:
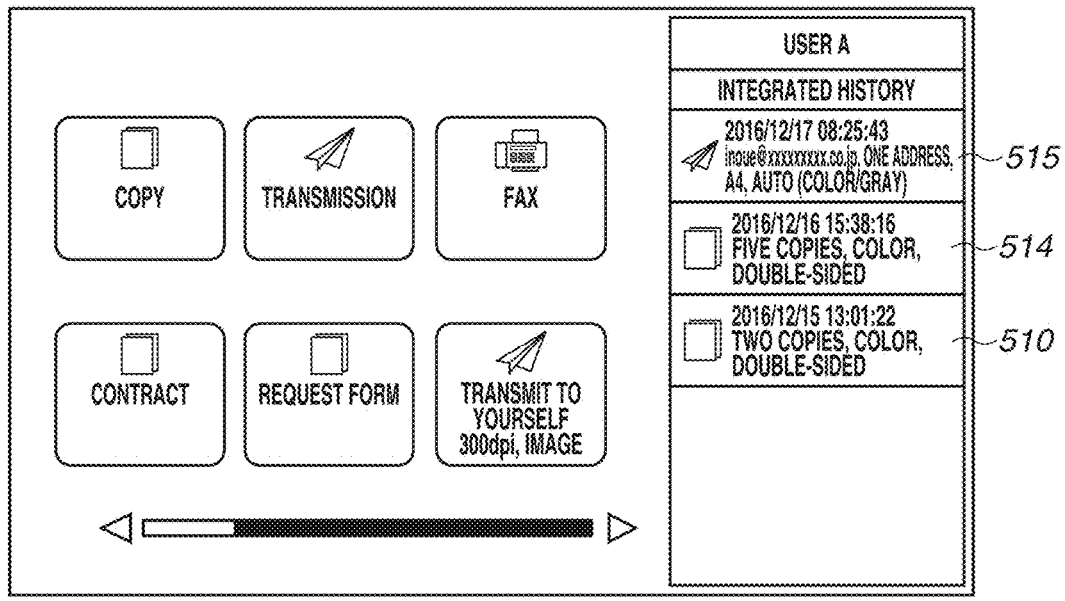

FIG. 5D illustrates a home screen displayed after a transmission job is further executed in the state of FIG. 5C. Since a setting history 515 corresponds to an application different from those of the setting histories 510 and 514, the setting history 515 is displayed with an application icon different from those of the setting histories 510 and 514.

Figure 5E:
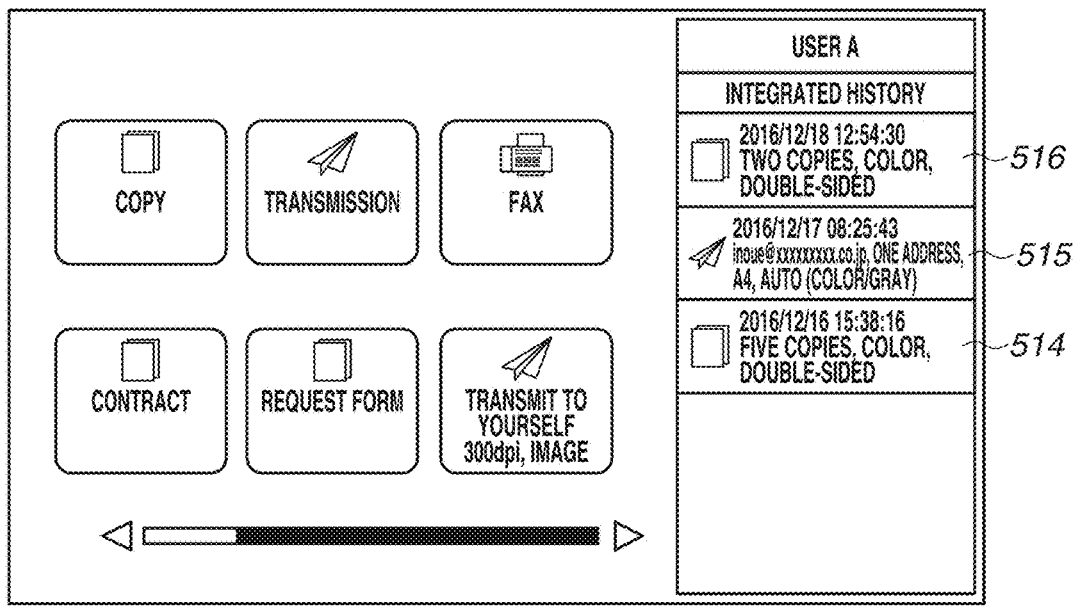

FIG. 5E illustrates a home screen displayed after the user presses the setting history 510 to call up the settings thereof, and then executes a job without changing the settings in the state of FIG. 5D. When the jobs are executed with the same settings, the setting history 510 with the older execution date and time is not displayed but only a new setting history 516 is displayed. By preventing display of multiple setting histories with the same settings in this way, it is possible to display setting histories of various settings in the integrated history 509.

Figure 5F:
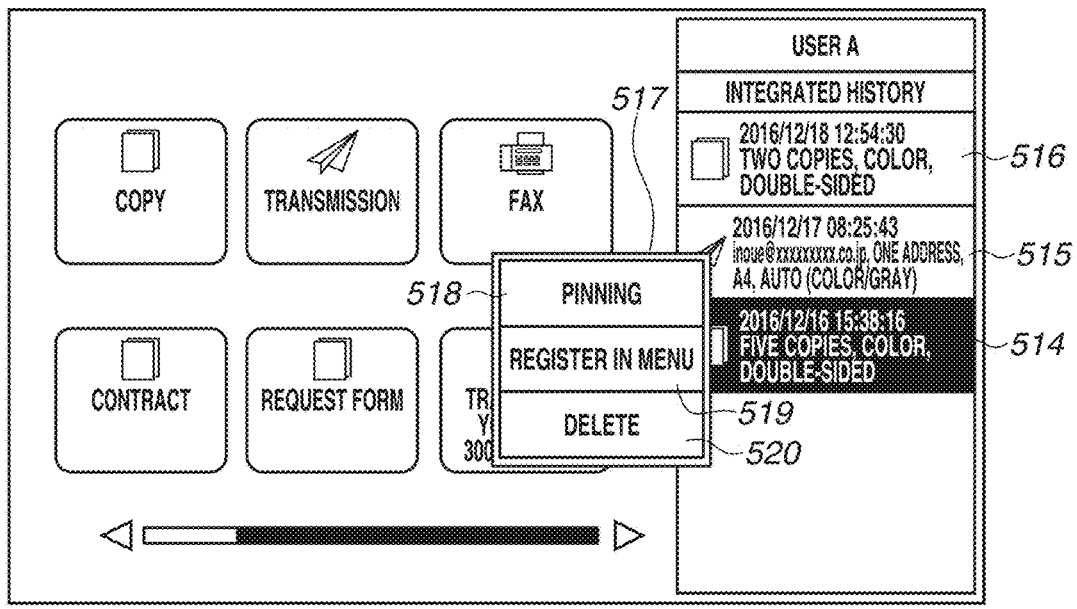

FIG. 5F illustrates a screen displayed when the user long-presses (i.e., presses and keeps the state for a predetermined time period or longer) the setting history 514 in FIG. 5E. Upon detecting the long press on the setting history 514, the image processing apparatus 1 displays a context menu 517 on the home screen. The context menu 517 is a menu screen for making settings on the selected setting history. The context menu 517 includes a "pinning" button 518, a "register in menu" button 519, and a "delete" button 520. The user long-presses the setting history to display the context menu 517, lifts the finger once from the touch panel 200 and then presses one of the buttons 518 to 520, whereby the processing corresponding to the pressed button is performed. The "pinning" button 518 is for preventing display of the selected setting history from disappearing from the integrated history 509. The "register in menu" button 519 is for displaying, on the menu 500, a custom button having the same settings as the selected setting history. Upon detecting the pressing of the "register in menu" button 519, the image processing apparatus 1 displays, on the touch panel 200, a screen for setting the name of a custom menu and a comment to be displayed on the custom button. Thereafter, it is determined whether to set the custom button as the My button or as the shared button. In the present exemplary embodiment, a screen for setting the name and the comment, and a screen for setting the My button and the shared button will be described as different screens. The name and the comment, as well as the My button and the shared button, may be set on the same screen. As a result, a custom button for calling up the setting values, displayed as the setting history, can be displayed on the menu 500. The "delete" button 520 is for preventing the selected setting history from being displayed in the integrated history 509.

Figure 5G:
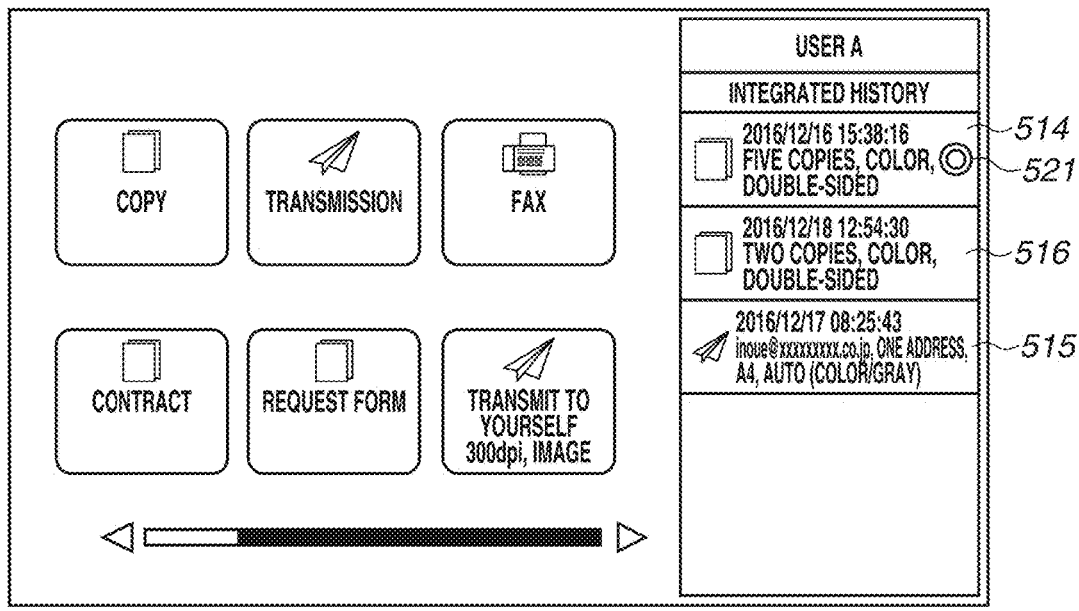

FIG. 5G illustrates a home screen displayed after the "pinning" button 518 is pressed in FIG. 5F. The setting history to which pinning has been instructed is displayed at the top in the integrated history 509. Furthermore, a pinning icon 521 is added to the setting history to indicate that the setting history is pinned. When the user executes a job with the pinned setting history displayed in the integrated history 509, the setting history with the latest execution date and time is displayed below the pinned setting history.

The image processing apparatus 1 according to the present exemplary embodiment can pin a setting history displayed in the integrated history 509. By pinning the setting history that is frequently called up from among the setting histories and used by the user, it is possible to prevent that setting history from disappearing from the integrated history 509. The pinning does not require settings such as name setting and comment input. Therefore, the user can easily display the setting history, as the settings to be frequently used, in the integrated history 509. In addition, by displaying the pinned setting history above the other setting histories, it becomes easy to search the integrated history 509 for that setting history.

Figure 5H:
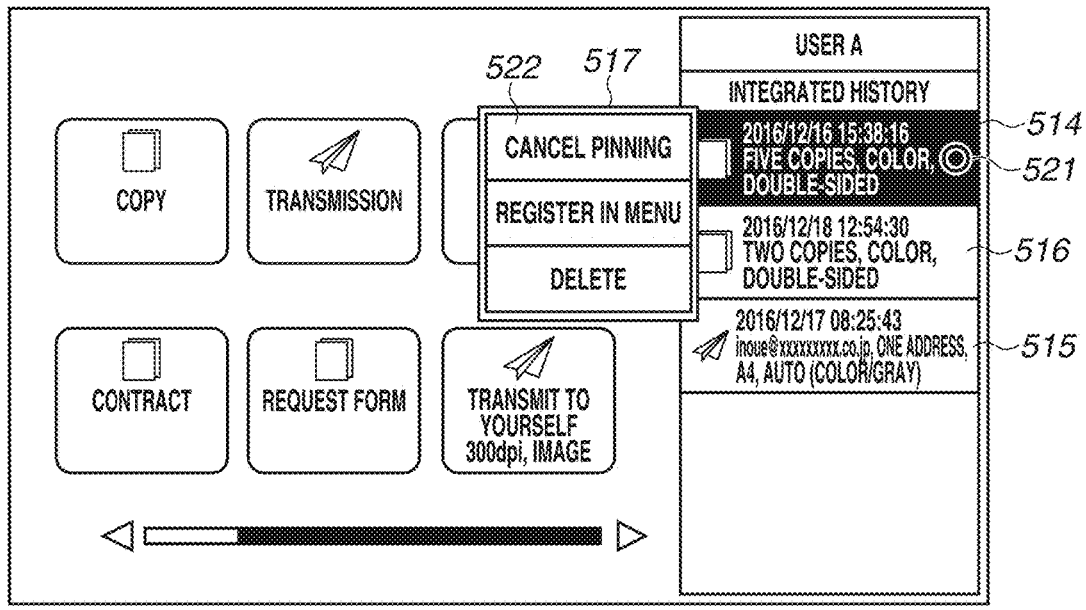

FIG. 5H illustrates a screen displayed when the pinning of the pinned setting history in FIG. 5G is canceled. Upon detecting the long press on the pinned setting history, the image processing apparatus 1 displays the context menu 517. The context menu 517 in this case includes a "cancel pinning" button 522, the "register in menu" button 519, and the "delete" button 520. Upon detecting the pressing of the "cancel pinning" button 522 by the user, the image processing apparatus 1 cancels the pinning of a button ID corresponding to the pinned setting history, and sorts and displays the setting histories in reverse chronological order of the job execution time in the integrated history 509.

FIGS. 10A to 10E illustrate an example integrated history data table 1000 for managing the setting histories displayed in the integrated history 509. The data table illustrated in FIGS. 10A to 10E is stored in the HDD 103. As described in a table header, this table stores a button ID, an application ID, data, and text data indicating date and time and setting values to be displayed on the home screen.

The button ID is a number for identifying a button indicating a setting history displayed in the integrated history 509.

The application ID is a number indicating which application the setting history is associated with. The correspondence between the type of the application and the application ID is determined in advance. For example, it is determined that the application ID of copy is "101" and the application ID of transmission is "201".

The data indicates the name of a file in which the setting values of the setting history are stored. This file is in a format readable by each application, and the setting values of all the settings used by the application are stored in the file. For example, in the case of copy, the setting values include the number of copies, the setting of black-and-white/color at the time of printing, and a sheet size.

The display text indicates the date and time and setting contents displayed in the setting history in the integrated history 509. The date and time are text data indicating the date and time when the job of the setting history was executed. The setting value is text data of a setting that satisfies a predetermined condition among the settings stored as the setting history. For example, the setting value corresponds to a setting item changed by the user from the default setting. With the execution date and time and settings of the job displayed in the integrated history 509, the user can easily remember when the job was executed and what kind of settings was done in the setting history.

FIG. 10A corresponds to FIG. 5A, and a setting history is not yet registered in the integrated history data table 1000.

FIG. 10B corresponds to FIG. 5B, and the setting history 510 corresponds to the data of a button ID 1001. The button ID 1001 corresponds to the copy setting history of the application ID "101", the name of a file storing the setting values is "data1.xml", the date and time text is "2016/12/15 13:01:22", and the setting value text is "two copies, color, double-sided printing".

FIG. 10C corresponds to FIG. 5C, and the setting history 514 corresponds to the data of a button ID 1002.

FIG. 10D corresponds to FIG. 5D, and the setting history 515 corresponds to the data of a button ID 1003.

FIG. 10E corresponds to FIG. 5E, and the setting history 516 corresponds to the data of the button ID 1001. In FIG. 10E, the date and time in the display text of the button ID 1001 is updated from "2016/12/15 13:01:22" to "2016/12/18 12:54:30".

FIGS. 14A and 14B illustrate an example data table 1500 for managing the display order of the setting histories managed by the integrated history data table 1000 and ON/OFF of a pinning flag. This data table is stored in the HDD 103.

The column of "order" indicates the order of displaying the setting histories. The column of "button ID" stores the button IDs of the setting histories displayed in the integrated history 509. The column of "pinning" stores information indicating whether the pinning flag of the setting history corresponding to the button ID described on the left is ON or OFF.

For example, FIG. 14A illustrates the data table 1500 for displaying the home screen illustrated in FIG. 5E. In the integrated history 509, the setting histories are displayed in order of the corresponding button IDs 1001, 1003, and 1002 from the top. Therefore, in the integrated history 509, the setting histories 516, 515, and 514 are displayed in that order. Since the pinning flag is OFF in the setting histories of all the button IDs, no setting history is pinned.

Meanwhile, FIG. 14B illustrates the data table 1500 for displaying the home screen illustrated in FIG. 5G. The setting history 514 of the button ID 1002 of which the pinning is set to ON is displayed at the top, and then the setting histories of the button IDs 1001 and 1003 are displayed in reverse chronological order of the execution date and time.

Hereinafter, the processing performed by the image processing apparatus 1 will be described with reference to a flowchart.

Figure 3:
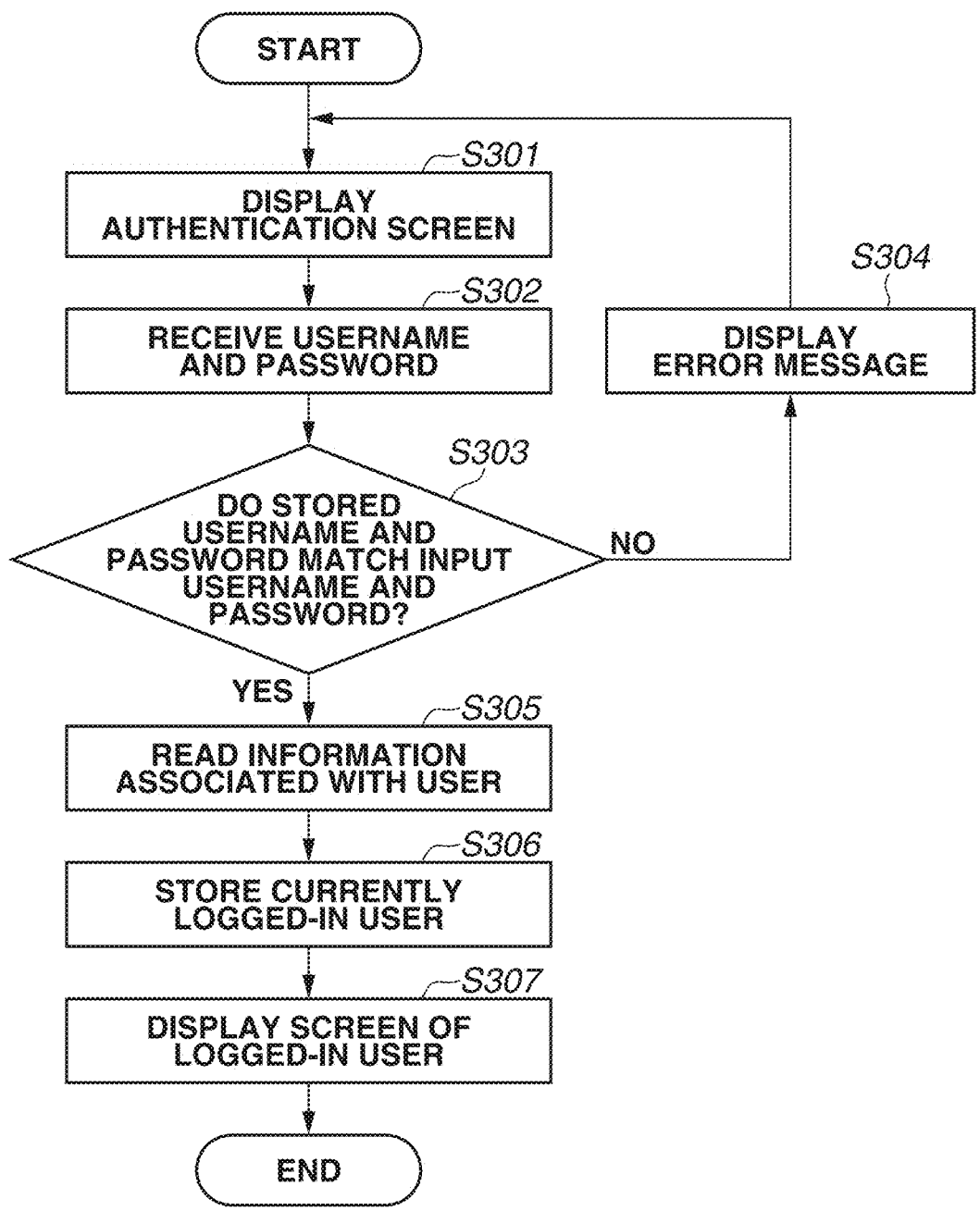
FIG. 3 is a flowchart illustrating processing from activating the image processing apparatus to displaying a screen for a logged-in user.
Figure 4:
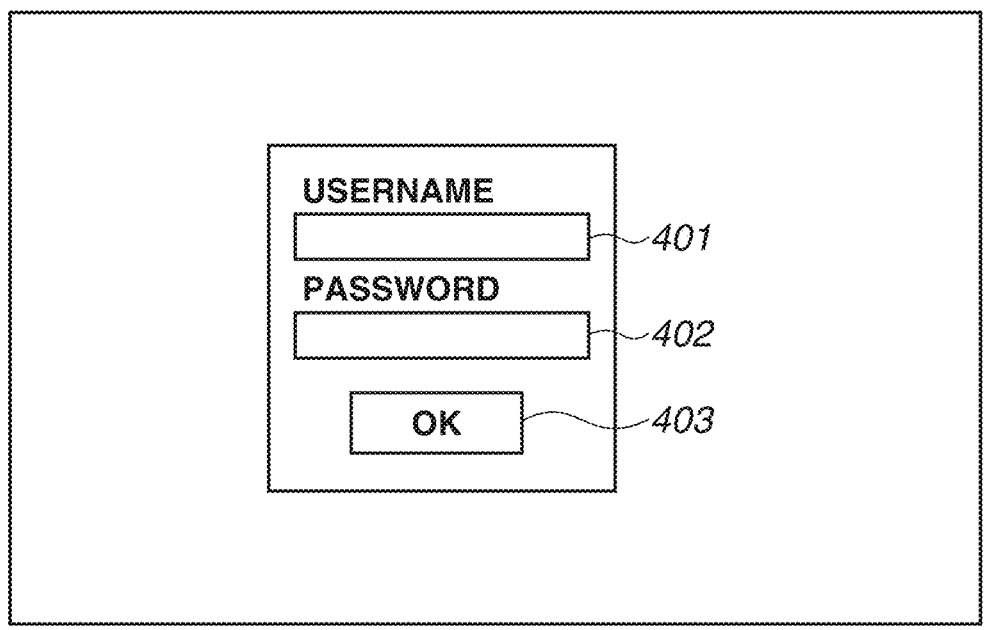
FIG. 4 is a diagram illustrating an exemplary authentication screen displayed on a touch panel according to the first exemplary embodiment.

First, processing in which the user logs into the image processing apparatus 1 will be described with reference to FIGS. 3 and 4. FIG. 3 is a flowchart illustrating processing from activating the image processing apparatus 1 according to the present exemplary embodiment to displaying a screen for a logged-in user. The processing described in this flowchart is implemented by the CPU 100 executing a program stored in the HDD 103 or the ROM 104. The processing illustrated in FIG. 3 is started when the power of the image processing apparatus 1 is turned on.

In step S301, the CPU 100 displays an authentication screen on the touch panel 200. FIG. 4 illustrates an example authentication screen displayed on the touch panel 200. The authentication screen includes a username input area 401, a password input area 402, and an "OK" button 403.

After displaying the authentication screen on the touch panel 200, in step S302, the CPU 100 receives input of a username and a password. Upon detecting that the username input area 401 or the password input area 402 has been pressed, the CPU 100 displays a software keyboard (not illustrated) on the touch panel 200. The user presses the software keyboard to input the username and the password. Upon detecting the pressing of the "OK" button 403, the CPU 100 advances the processing to step S303.

In step S303, Upon detecting the pressing of the "OK" button 403, the CPU 100 determines whether the input username and password matches a username and password stored in the HDD 103, respectively. If the input username and password do not match a username and password stored in the HDD 103 (NO in step S303), the processing proceeds to step S304. In step S304, the CPU 100 displays an error message on the touch panel 200 and then displays the authentication screen again.

If the usernames and the passwords each match (YES in step S303), the processing proceeds to step S305. In step S305, the CPU 100 calls up, from the HDD 103, information associated with the user identified by the login processing. The information associated with the user includes, for example, information indicating the history of a job executed by the logged-in user and information about the custom buttons displayed on the menu screen illustrated in FIGS. 5A to 5H. For example, the information is the integrated history data table 1000 illustrated in FIGS. 10A to 10E or a custom button management data table 2300 illustrated in FIGS. 21A and 21B.

In step S306, the CPU 100 stores, in the HDD 103, the authenticated user as the current logged-in user. Thereafter, in step S307, the CPU 100 displays, on the touch panel 200, a home screen reflecting the called information of the logged-in user.

Next, processing to be performed until the user who has logged in to the image processing apparatus 1 executes a job will be described with reference to FIGS. 6 to 8C.

First, a series of operations to be performed until the user executes a job in the image processing apparatus 1 will be described with reference to FIGS. 7A and 7B.

After the user logs in to the image processing apparatus 1, the home screen illustrated in FIGS. 5A to 5H is displayed on the touch panel 200. The user selects an application to be used from the menu 500 on the home screen. Here, a case where the user selects copy will be described as an example.

The user presses the application button 501 displayed on the menu 500 on the home screen. Upon detecting the pressing of the application button 501 by the user, the image processing apparatus 1 displays a "copy" screen 700 illustrated in FIG. 7A on the touch panel 200. FIG. 7A illustrates the "copy" screen 700 in which default setting values are set.

The "copy" screen 700 includes an area 701 for displaying setting values of color, magnification, sheet size, and the number of copies, and buttons for setting. A button 702 is for confirming the current settings in a list. When the user presses the button 702, details of the current settings are displayed on the touch panel 200. A "select color" button 703 is for setting whether to perform black and white printing or color printing at the time of copy. A "magnification" button 704 is for setting the magnification to be applied at the time of copy. A "select sheet" button 705 is for setting the size and type of a sheet to be used at the time of printing. A "finish" button 706 is for setting, for example, whether to shift the sheet discharge position for each set or for each page at the time of ejecting printed sheets. A "double-sided" button 707 is for setting whether to perform double-sided printing or single-sided printing at the time of copy. A "density" button 708 is for setting the density to be applied at the time of printing. A "type of document" button 709 is for setting the type of a document to be read by a scanner. A "copy ID card" button 710 is for setting the mode of printing both the front side and the back side of a document on one side of a sheet. An "other functions" button 711 is for setting items that cannot be set on the "copy" screen 700, such as the setting for giving a page number and a management number to a printed sheet. A "setting history" button 712 is for using the settings of a copy job executed by the user in the past. A "frequently used settings" button 713 is for making the settings registered in advance by the user.

Figure 7A:
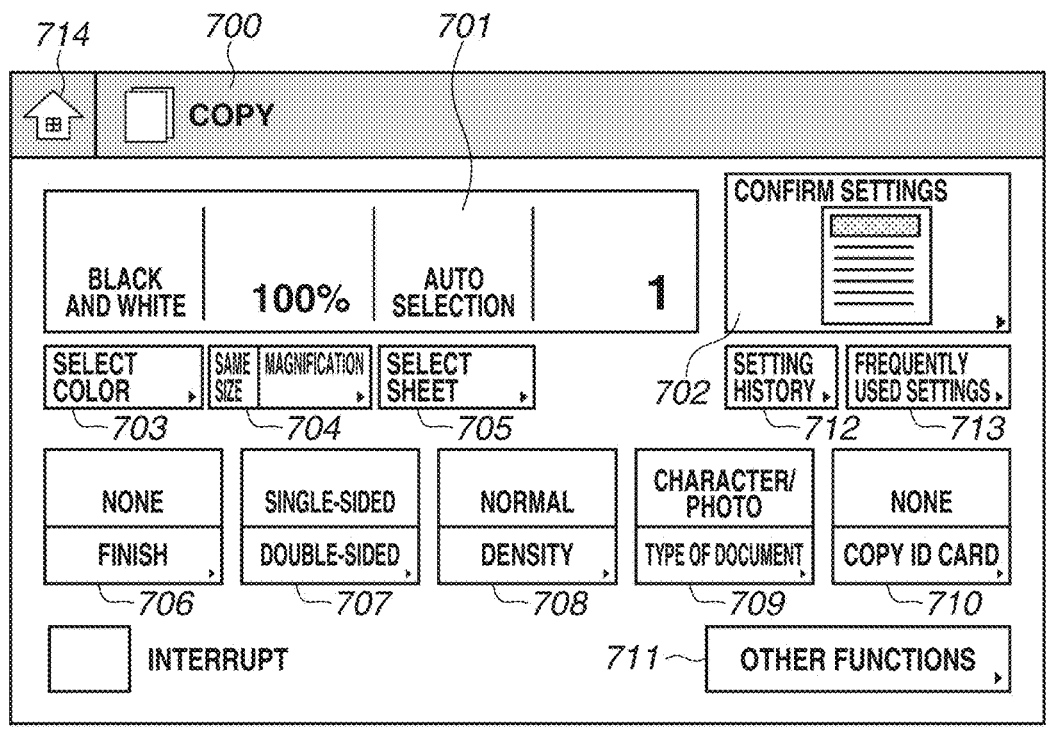
FIGS. 7A and 7B are schematic views illustrating an example copy screen associated with a copy function of the image processing apparatus according to the first exemplary embodiment.
Figure 7B:
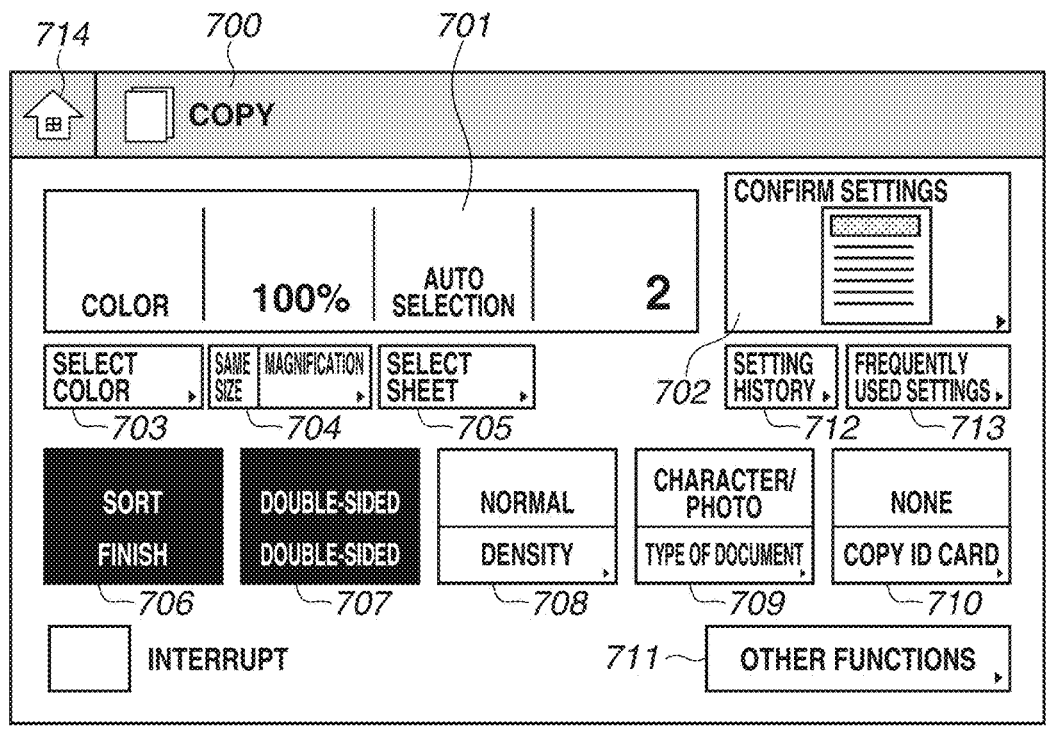

FIG. 7B illustrates the "copy" screen 700 in which the user has set color printing, the number of copies being two, the sort setting for changing the sheet discharge position for each set of printed sheets, and double-sided printing. The user presses the start key 201, after making the settings using the touch panel. Upon detecting the pressing of the start key 201, the image processing apparatus 1 executes a job according to the settings made via the touch panel 200.

Figure 6:
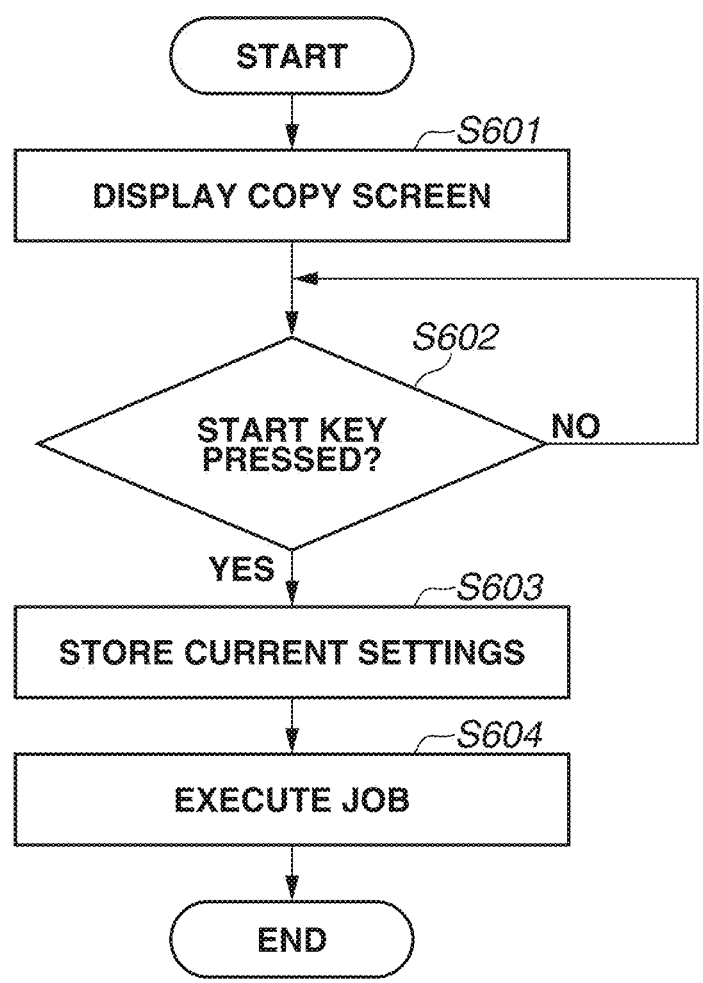
FIG. 6 is a flowchart illustrating processing from starting an application to executing a job according to the first exemplary embodiment.

FIG. 6 is a flowchart illustrating processing from start of an application to execution of a job by the image processing apparatus 1. The processing illustrated in FIG. 6 is implemented by the CPU 100 executing a program stored in the HDD 103 or the ROM 104.

In FIG. 6, a case where the user has selected a copy application in the menu 500 will be described as an example.

Upon detecting the pressing of the application button 501 displayed on the menu 500, in step S601, the CPU 100 displays, on the touch panel 200, the "copy" screen 700 in which the default setting values illustrated in FIG. 7A are set. Thereafter, the CPU 100 accepts the settings of a copy job from the user.

In step S602, the CPU 100 determines whether the start key 201 has been pressed. The CPU 100 continues the processing of step S602 (NO in step S602) until detecting the pressing of the start key 201.

If it is determined that the start key 201 has been pressed (YES in step S602), the processing proceeds to step S603. In step S603, the CPU 100 stores the current settings of the job in the HDD 103. FIG. 8A is a schematic diagram of a data table for storing the settings of a copy job. A copy data table 800 is stored in the HDD 103. Types 801 on the first row indicate types of setting values. Default settings 802 on the first row of the copy data table 800 indicate the default setting values of the copy function. Current settings 803 on the second row indicate the setting values of the job applied when the CPU 100 detects the pressing of the start key 201. FIG. 8A illustrates examples of setting values that may be stored; setting values other than those illustrated may also or alternatively be stored. In FIG. 8B, types 804 indicates types of setting values.

After storing the current settings in the HDD 103, in step S604, the CPU 100 controls the image processing unit 13 to execute the job. The CPU 100 controls the image processing unit 13 to generate an output image reflecting the settings made on the "copy" screen 700. The image processing apparatus 1 prints the generated output image on a sheet.

Referring to FIG. 6, the case where the image processing apparatus 1 executes a copy job has been described as an example. The type of a job executed by the image processing apparatus 1 is not limited to the copy job, and similar processing is performed also when a transmission job, a fax job, a print job, or a scan job is executed. For example, when a transmission job is executed, in step S603, the CPU 100 stores the current setting values in a transmission data table 1400 stored in the HDD 103. FIG. 8C is a diagram illustrating an example transmission data table associated with a transmission job. Types 1401 indicate types of setting values. Default settings 1402 indicate setting values registered in the image processing apparatus 1 in advance, and current settings 1403 indicate setting values set at the time of executing a transmission job.

In the present exemplary embodiment, as described with reference to FIG. 6, pressing of the start key is detected, and then the current settings are stored in the HDD 103 at the timing of starting a job. Therefore, the setting history of a job that has been normally executed, and the setting history of a job that has been interrupted due to a communication error, running out of sheets, or a cancel operation by the user are displayed in the integrated history 509. In this way, when the user executes the previously interrupted job again, it is possible to call up the previous settings of the job without making the settings all over again.

In the present exemplary embodiment, description will be given assuming that both the setting history of a job that has been normally executed and the setting history of a job that has been interrupted halfway are displayed in the integrated history 509. Alternatively, only the setting history of a job that has been normally executed may be displayed in the integrated history 509.

Processing for displaying a setting history in the integrated history 509 after job execution will be described with reference to FIGS. 9, 11, and 12.

FIG. 9 is a flowchart illustrating processing for the image processing apparatus 1 to determine the contents to be registered in the integrated history data table 1000 from among the settings of a job stored as the current settings.

The processing illustrated in FIG. 9 is implemented by the CPU 100 executing a program stored in the HDD 103 or the ROM 104. The processing illustrated in FIG. 9 is executed upon completion of the processing illustrated in FIG. 6.

In step S901, the CPU 100 acquires information registered in the integrated history data table 1000 stored in the HDD 103. Here, the CPU 100 refers to the application ID of the executed job and acquires, from the integrated history data table 1000, information in the "data" column associated with the setting history having the same application ID as the executed job.

In step S902, the CPU 100 compares the current settings 803 with the data of the setting history stored in the integrated history data table 1000 and acquired in step S901, and determines whether the same settings as the current settings are stored in the integrated history data table 1000.

If there is no setting history having the same settings as the current settings in the integrated history data table 1000 (NO in step S902), the processing proceeds to step S903. In step S903, the CPU 100 performs processing for generating text data to be displayed in the integrated history 509. The processing performed by the CPU 100 in step S903 will be described below with reference to FIG. 11.

After generating the text to be displayed as the setting history, in step S904, the CPU 100 stores, in the HDD 103, the contents to be registered in the integrated history data table 1000. The contents to be registered in the integrated history data table 1000 include an application ID, a file name of setting data, text data indicating setting values and execution date and time, and a flag indicating presence/absence of existing data. The text data indicating the execution date and time is the date and time when the job has been started. The flag indicating presence/absence of existing data is a flag determined based on the determination result in step S902 and indicates whether a setting history having the same settings as the executed job is stored in the HDD 103. Since a setting history is newly generated, the flag indicates that there is no existing data in step S904.

If it is determined in step S902 that a setting history having the same settings as the currently executed job is stored in the integrated history data table 1000 (YES in step S902), the processing proceeds to step S905, and the CPU 100 performs the following processing. In step S905, the CPU 100 generates text data indicating the date and time when the job has been executed. Thereafter, in step S906, the CPU 100 stores, in the HDD 103, the button ID of the setting history having the same settings as the executed job, the text data indicating the execution date and time of the job and generated in step S905, and the flag indicating presence/absence of existing data. Since the executed job has the same settings as the settings stored in the integrated history data table 1000, the flag indicates that the existing data is present in step S906.

After completing the processing described in step S904 or S906, the CPU 100 ends the processing illustrated in FIG. 9.

Figure 11:
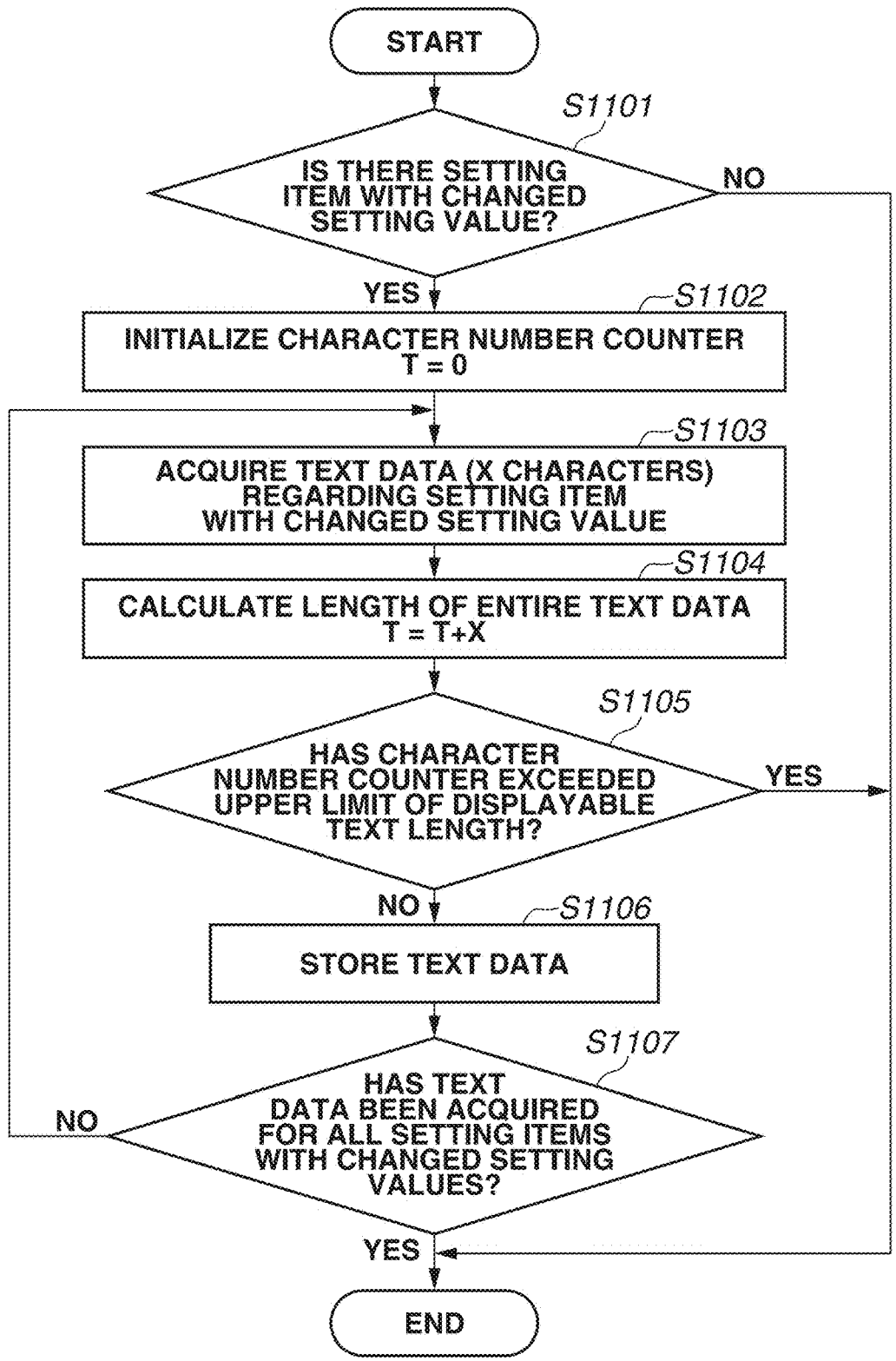
FIG. 11 is a flowchart illustrating processing for generating text of a setting value displayed in a setting history in the integrated history according to the first exemplary embodiment.

FIG. 11 is a flowchart illustrating processing for the CPU 100 to generate the text of the setting values in step S903 of FIG. 9. The processing illustrated in FIG. 11 is implemented by the CPU 100 executing a program stored in the HDD 103 or the ROM 104.

First, in step S1101, the CPU 100 compares the current settings 803 with the default settings 802 of the copy data table 800 stored in the HDD 103 and determines whether there is a setting item with a changed setting value. If a setting value has been changed in one or more setting items as a result of the comparison, the CPU 100 determines that there is a setting item with a setting value changed from the default setting (YES in step S1101). If a setting value has not been changed from the default setting (NO in step S1101), the CPU 100 ends the processing described in this flowchart.

If there is a setting item with a setting value changed from the default setting (YES in step S1101), the processing proceeds to step S1102. In step S1102, the CPU 100 initializes, to 0, a character number counter T for counting the number of characters in the text data of the setting value.

In step S1103, the CPU 100 acquires, from the copy data table 800, text data (X characters) regarding the setting item located at the leftmost position in the copy data table 800 from among the setting items with changed setting values. In this case, since there is a difference in the number of copies, the CPU 100 acquires text data "two copies".

Next, in step S1104, the CPU 100 calculates the length of the entire text data acquired from the copy data table 800 so far. The CPU 100 adds the number of characters X of the text data acquired in step S1103 to the value of the current character number counter T.

In step S1105, the CPU 100 determines whether the character number counter T calculated in step S1104 has reached a predetermined upper limit of a displayable text length. The size of the area for displaying one setting history in the integrated history 509 is limited. Therefore, the length of text that can be displayed in one setting history is limited. In step S1105, the CPU 100 determines whether the length of the acquired text data exceeds the displayable text length.

In step S1105, if it is determined that the length of the acquired text data exceeds the displayable upper limit (YES in step S1105), the CPU 100 discards the text data acquired for the setting item of which the text data has been acquired last, and ends the processing.

If the character number counter T is determined in step S1105 to have not reached the upper limit of the displayable characters (NO in step S1105), the processing proceeds to step S1106. In step S1106, the CPU 100 stores the text data acquired in step S1103 as text data of a setting value to be displayed in the integrated history 509.

In step S1107, the CPU 100 determines whether text data has been acquired for all the setting items with setting values changed from the default settings. If there is still a setting item with a changed setting value of which text data has not been acquired (NO in step S1107), the processing returns to step S1103, and the CPU 100 repeats the processing of steps S1103 to S1107. At this time, in step S1103, the CPU 100 acquires text data regarding the leftmost setting item in the copy data table 800 among the setting items of which text data has not yet been acquired. When text data has been acquired for all the setting items with setting values changed from the default settings (YES in step S1107), the CPU 100 ends the processing described in this flowchart. In the copy data table illustrated in FIG. 8A, "two copies, color, double-sided" is generated as text data.

In FIG. 11, when the number of setting items with changed setting values is large and not all these setting items with changed setting values can be displayed in the setting history, the setting item exceeding the number of characters that can be displayed in the setting history is not displayed. However, if the changed setting values are not displayed for all the setting items, an indicator such as " . . . " may be added to the end of the text indicating the setting values of the setting history. Alternatively, a character string "others" may be displayed instead of the indicator to make it clear that there is still a setting item with a changed setting value, in addition to the setting items being displayed.

Figure 12:
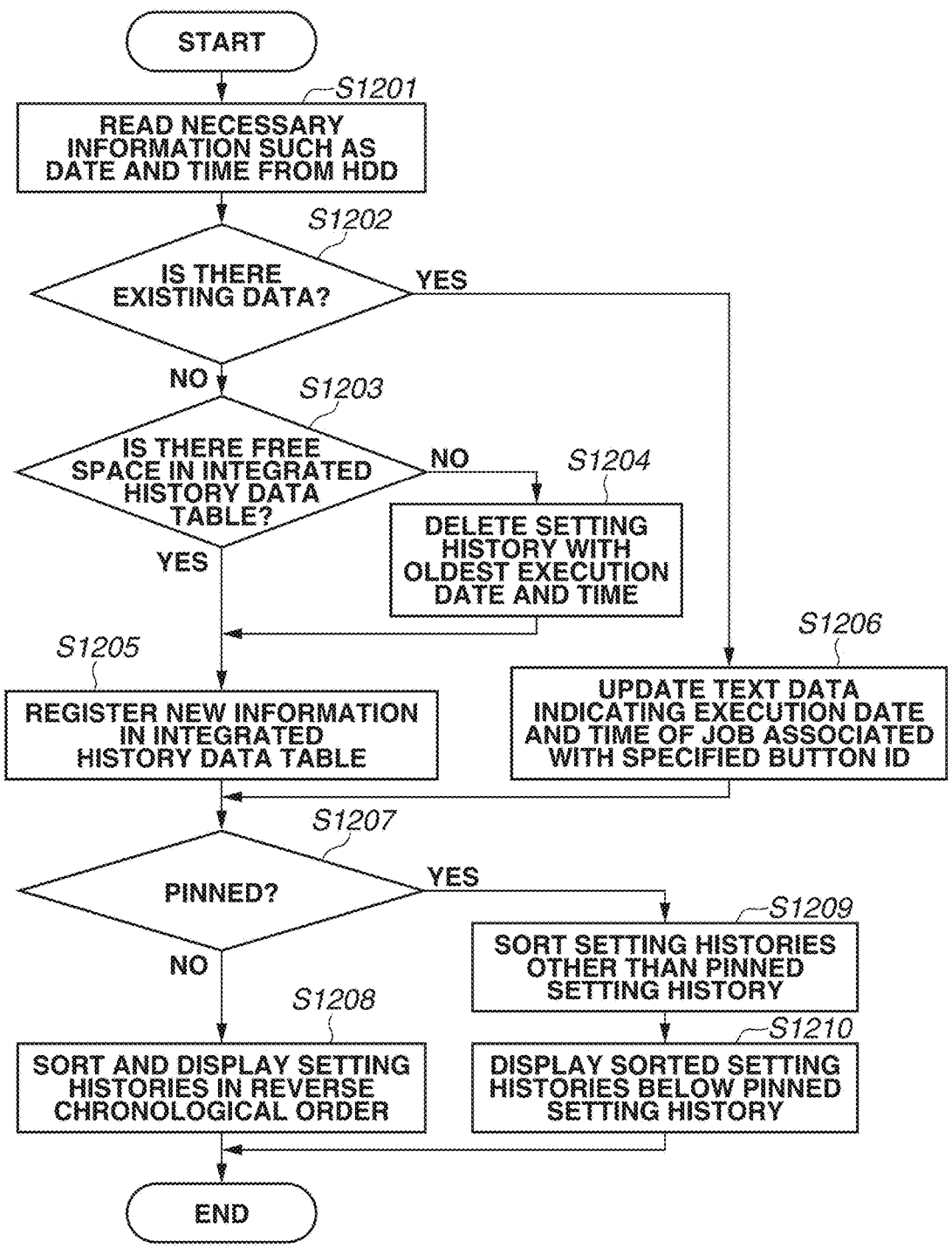
FIG. 12 is a flowchart illustrating processing for displaying the setting history on a home screen according to the first exemplary embodiment.

FIG. 12 is a flowchart illustrating processing performed until the image processing apparatus 1 displays, as the setting history, the current settings in the integrated history 509. The processing illustrated in FIG. 12 is implemented by the CPU 100 executing a program stored in the HDD 103 or the ROM 104. The processing illustrated in FIG. 12 is executed by the CPU 100 when the touch panel 200 displays the home screen after the user executes a job.

In step S1201, the CPU 100 reads the information stored in the HDD 103 in step S904 or step S906 of FIG. 9.

Next, in step S1202, the CPU 100 checks the flag indicating presence/absence of existing data in the data read in step S1201. If there is no existing data (NO in step S1202), the processing proceeds to step S1203. In step S1203, the CPU 100 determines whether there is a free space in the integrated history data table 1000. If there is a free space in the integrated history data table 1000 (YES in step S1203), the processing proceeds to step S1205.

If there is no free space in the integrated history data table 1000 (NO in step S1203), the processing proceeds to step S1204. In step S1204, the CPU 100 deletes, from the integrated history data table 1000, the setting history with the oldest execution date and time among the setting histories not pinned. In step S1204, the CPU 100 refers to the data table 1500 to acquire, from the setting history data table, the setting history of the button ID in which pinning is set to OFF. The CPU 100 identifies the setting history with the oldest date and time of the job from the display text of the acquired setting history and deletes that setting history from the integrated history data table 1000.

Then, in step S1205, the CPU 100 registers the information read in step S1201 in the integrated history data table 1000. In step S1205, the CPU 100 assigns a button ID to information about the setting history when registering the information in the integrated history data table 1000. FIG. 10B illustrates the integrated history data table 1000 to which the data read from the HDD 103 has been added.

In step S1202, if there is existing data (YES in step S1202), the processing proceeds to step S1206. In step S1206, the CPU 100 identifies, from the integrated history data table 1000, the button ID of the setting history having the same settings as those acquired in step S1201. Thereafter, in step S1206, the CPU 100 updates the text data indicating the execution date and time of the job with respect to the setting history associated with the specified button ID.

After the processing in step S1205 or S1206, in step S1207, the CPU 100 reads the data table 1500 and determines whether there is a pinned setting history.

If there is no pinned setting history (NO in step S1207), the processing proceeds to step S1208. In step S1208, the CPU 100 sorts the setting histories stored in the integrated history data table 1000 in reverse chronological order of date and displays the setting histories on the touch panel 200.

In step S1207, if there is a pinned setting history in the data table 1500 (YES in step S1207), the processing proceeds to step S1209. In step S1209, the CPU 100 sorts the setting histories other than the pinned setting history in reverse chronological order of the execution date and time.

In step S1210, the CPU 100 displays the setting histories sorted in step S1209 below the pinned setting history on the touch panel 200. In the present exemplary embodiment, if there is a plurality of pinned setting histories, the CPU 100 displays the pinned setting histories in reverse chronological order of the date and time at which the pinning has been set. In the case where there is a plurality of pinned setting histories, the arranging order of the pinned setting histories is not limited to the above order. For example, the user may set the display order of the pinned setting histories. Alternatively, the pinned setting histories may be arranged in reverse chronological order of job execution.

Next, processing for calling up the settings from a setting history displayed in the integrated history 509 will be described. Assume that, for example, the home screen illustrated in FIG. 5B is displayed on the touch panel 200. At this time, upon detecting that the setting history 510 has been pressed, the CPU 100 displays the "copy" screen 700 illustrated in FIG. 7B on the touch panel 200. As the setting history displayed in the integrated history 509 is pressed, the setting screen of the job in which the setting values associated with the pressed setting history are set is displayed on the touch panel 200.

Figure 13:
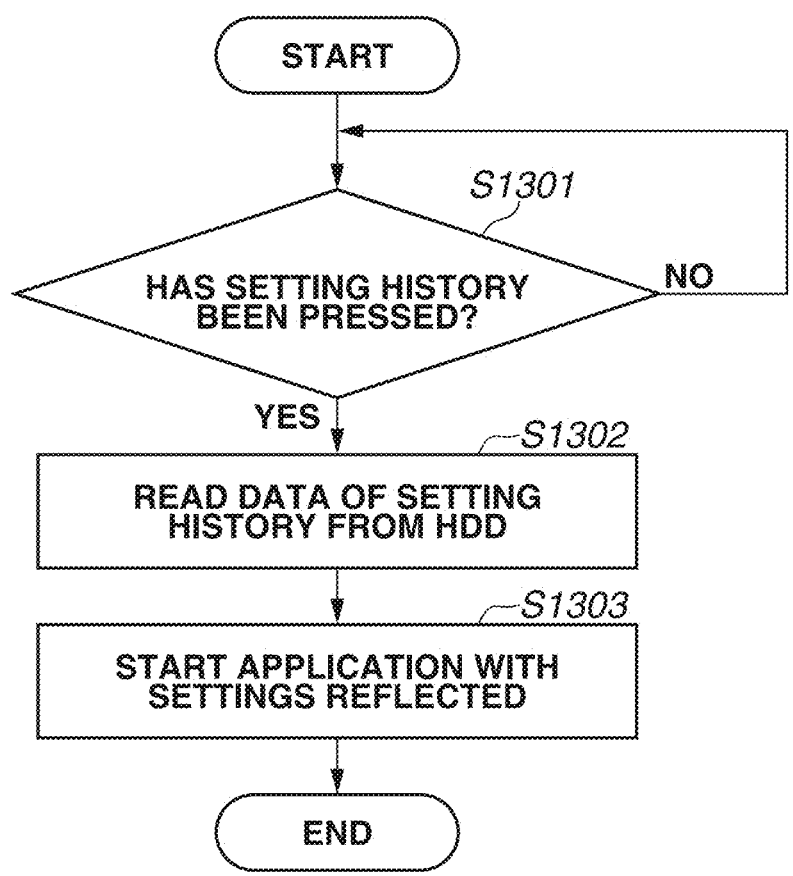
FIG. 13 is a flowchart illustrating processing for starting an application from the integrated history according to the first exemplary embodiment.

The processing for calling up the settings from the setting history displayed in the integrated history 509 will be described with reference to FIG. 13. The processing illustrated in FIG. 13 is implemented by the CPU 100 executing a program stored in the HDD 103 or the ROM 104. FIG. 13 is a flowchart illustrating the processing for calling up an application from the integrated history 509.

In step S1301, the CPU 100 determines whether the setting history displayed in the integrated history 509 has been pressed. The CPU 100 performs the processing described in step S1301 (NO in step S1301) until detecting the pressing of the setting history.

In step S1301, if the pressing of the setting history is detected (YES in step S1301), the processing proceeds to step S1302. In step S1302, the CPU 100 reads, from the HDD 103, the settings of the setting history associated with the button ID corresponding to the button at the pressed position.

In step S1303, the CPU 100 displays, on the touch panel 200, the setting screen of the job reflecting the settings read in step S1302 and ends the processing described in this flowchart.

Executing the processing illustrated in FIG. 13 makes it possible to call up the settings once set with a single touch, and eliminate the need to make settings all over again when using the same settings as those of the job executed by the user in the past. In addition, when the user wants to execute a job while slightly changing the settings from the job executed by the user in the past, reading the past settings from the setting history makes it easier to make settings than the case of changing the default settings from scratch.

Figure 20:
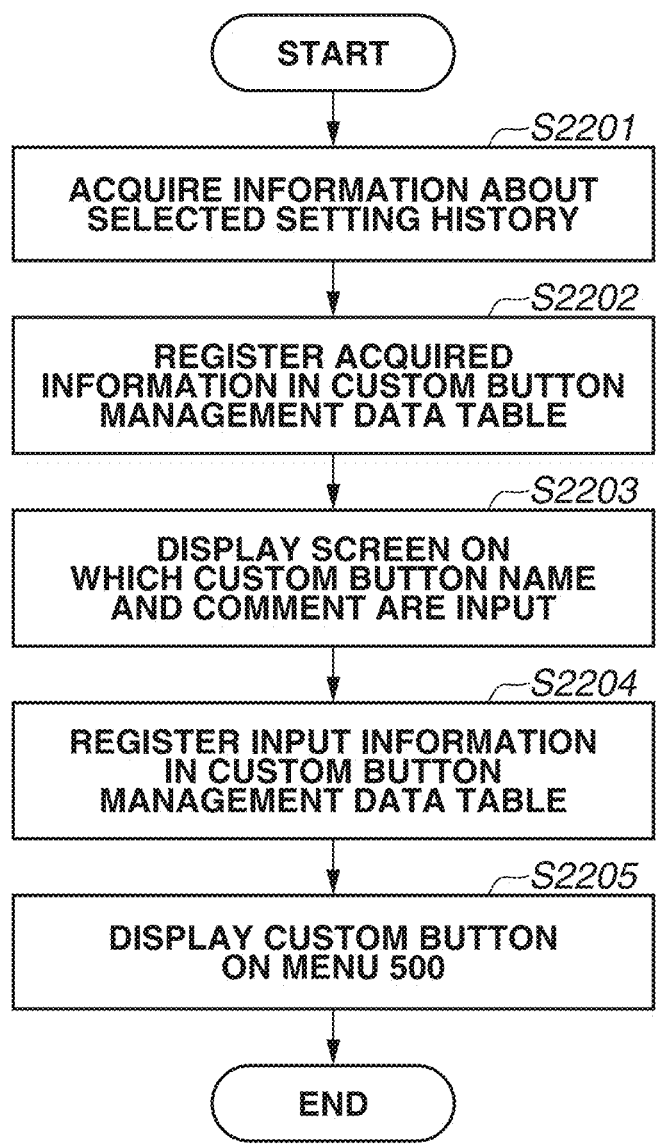
FIG. 20 is a flowchart illustrating processing performed at the time of registering a setting history, as a custom button, in a menu according to the other exemplary embodiments.

Processing for registering the setting history displayed in the integrated history 509 as a custom button in the menu will be described with reference to FIG. 20. The processing illustrated in FIG. 20 is implemented by the CPU 100 executing a program stored in the HDD 103 or the ROM 104. The processing illustrated in FIG. 20 starts when the CPU 100 detects the pressing of the "register in menu" button 519 of the context menu 517.

In step S2201, the CPU 100 acquires information about the selected setting history from the integrated history data table 1000.

In step S2202, the CPU 100 registers the information acquired in step S2201 in the custom button management data table 2300 that manages the settings registered in the custom buttons. FIGS. 21A and 21B illustrate an example of the custom button management data table 2300. The custom button management data table 2300 is stored in the HDD 103. The custom button management data table 2300 stores the button ID for identifying a custom button, the application ID for identifying the type of an application, data indicating the name of a file storing setting values, the name of the button, and the comment to be displayed. FIG. 21A is a data table obtained after the information registered in the integrated history data table 1000 is registered in the custom button management data table 2300 in step S2202.

In step S2203, the CPU 100 displays, on the touch panel 200, a screen for inputting the name and comment of the custom button.

In step S2204, the CPU 100 registers the name and comment input in step S2203 in the custom button management data table 2300. After the processing described in step S2204 is completed, the custom button management data table 2300 has names and comments registered as illustrated in FIG. 21B.

In step S2205, according to the registered settings, the CPU 100 generates a custom button, displays the custom button on the menu 500, and ends the processing described in this flowchart.

Displaying the setting history displayed in the integrated history 509 as a custom button on the menu 500 eliminates the need for the user to set the setting values again when registering the frequently used settings of the job executed in the past in the menu 500. At the time of registering a custom button, it is possible to set the name of the button and the comment displayed on the button. This makes it easier to understand which custom button is used in what situation. For example, the custom button 504 in FIG. 5A is used for copying a contract, and clearly indicates that "two copies, black and white printing, and single-sided printing" are set.

Figure 15A:
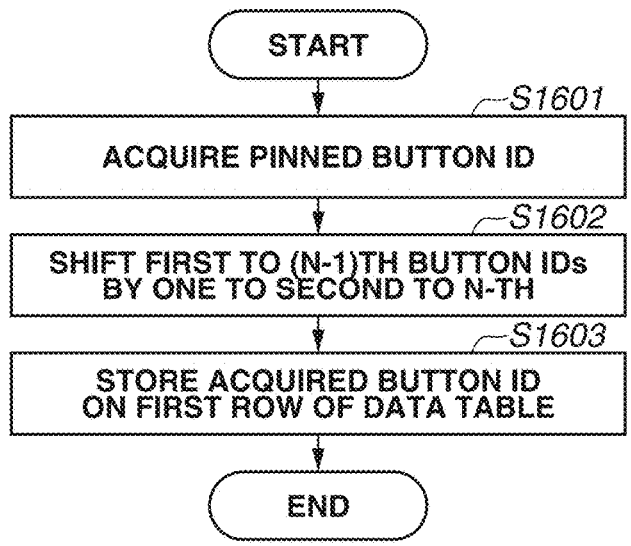
FIGS. 15A and 15B are flowcharts illustrating processing in a case where the setting history displayed in the integrated history is pinned and in a case where the pinning thereof is canceled, respectively, according to the first exemplary embodiment.
Figure 15B:
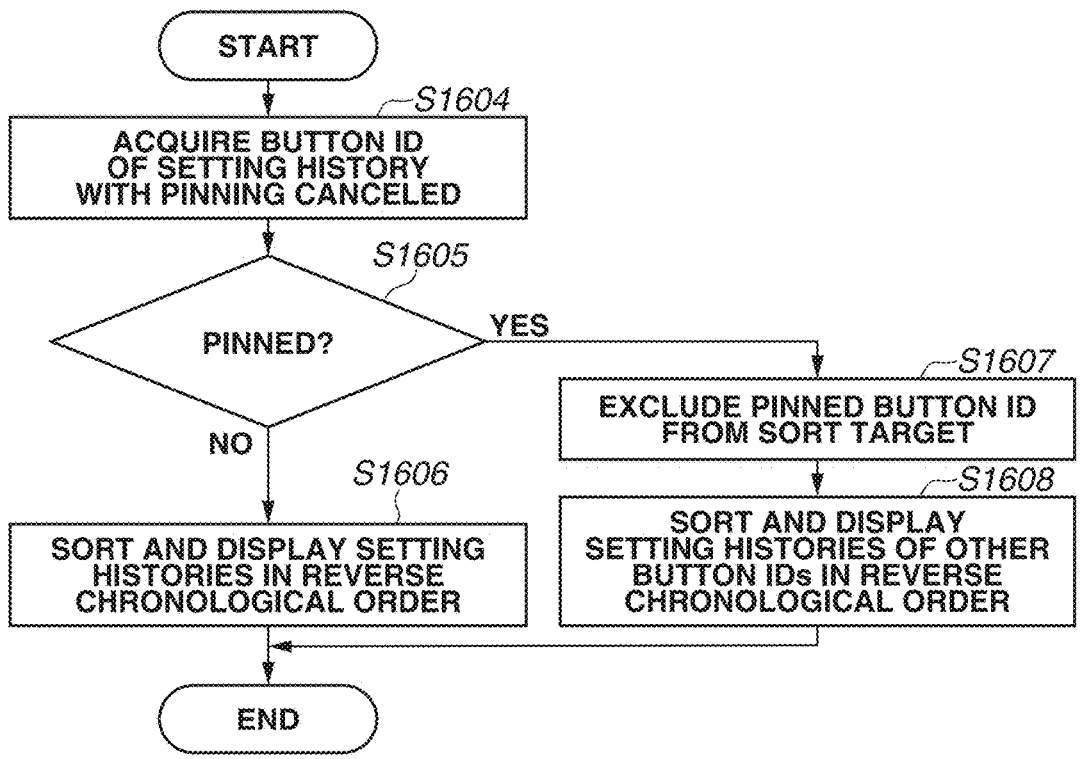

Next, pinning of the integrated history 509 will be described with reference to FIGS. 15A and 15B.

When the user long-presses the setting history, the context menu 517 for settings related to the setting history is displayed as illustrated in FIG. 5F. Although the long press is taken as an example of a user operation for displaying the context menu 517, how to call up the context menu 517 is not limited to the long press but may include double tap and placing a call button.

The processing performed by the user to pin the setting history displayed in the integrated history 509 will be described with reference to FIG. 15A. The processing illustrated in FIG. 15A is implemented by the CPU 100 executing a program stored in the HDD 103 or the ROM 104. The flowchart illustrated in FIG. 15A starts when the CPU 100 detects the pressing of the "pinning" button 518 in the context menu 517. In the present exemplary embodiment, a case where the N-th setting history displayed in the integrated history 509 is pinned will be described as an example.

In step S1601, the CPU 100 acquires the button ID of the pinned setting history.

In step S1602, the CPU 100 shifts the button IDs and the pinning flags currently stored at the first to (N−1)th positions in the data table 1500 to the second to N-th positions.

Finally, in step S1603, the CPU 100 stores the button ID acquired in step S1601 in the first row in the data table 1500, turns on the pinning flag, and ends the processing of this flowchart.

When the user sets to ON the pinning of the setting history displayed at the top of the integrated history 509, the CPU 100 turns on the pinning flag of the button ID positioned at the order of "1" in the data table 1500 and then ends the processing.

Finally, processing for canceling the pinning of the pinned setting history in the present exemplary embodiment will be described with reference to FIG. 15B. The processing illustrated in FIG. 15B is implemented by the CPU 100 executing a program stored in the HDD 103 or the ROM 104. In addition, the processing illustrated in FIG. 15B starts when the CPU 100 detects pressing of the "cancel pinning" button 522 in the context menu 517 illustrated in FIG. 5H.

In step S1604, the CPU 100 acquires, from the data table 1500, the button ID of the setting history in which the pinning has been canceled. For example, when the "cancel pinning" button 522 is pressed in the screen illustrated in FIG. 5H, the CPU 100 acquires the button ID "1002" corresponding to the setting history 514 from the data table 1500. Then, the CPU 100 turns off the pinning flag of the setting history associated with the button ID 1002 in the data table 1500.

Thereafter, in step S1605, the CPU 100 determines whether there is a pinned setting history in the data table 1500.

If there is no pinned setting history (NO in step S1605), the processing proceeds to step S1606. In step S1606, the CPU 100 sorts the setting histories of the button IDs registered in the data table 1500 in reverse chronological order of job execution time and displays the sorted setting histories on the touch panel 200.

If there is a pinned setting history in the data table 1500 (YES in step S1605), the processing proceeds to step S1607. In step S1607, the CPU 100 executes processing for excluding the pinned setting history from the setting histories to be sorted. Then, in step S1608, the CPU 100 sorts the remaining setting histories in reverse chronological order of job execution time and displays the sorted setting histories following the pinned setting history on the touch panel 200.

At the time of pinning the setting history displayed in the integrated history 509, it is not necessary to input the button name or comment unlike when registering the custom button. Therefore, it is possible to quickly set the pinning by displaying the context menu 517 on the menu screen and pressing the "pinning" button 518. Similarly, it is possible to quickly cancel the pinning by displaying the context menu 517 on the menu screen and pressing the "cancel pinning" button 522. The pinning can be easily set as compared to the registration of the custom button. By temporarily pinning the setting history displayed in the integrated history 509, it is possible to prevent that setting history from disappearing from the integrated history 509. Meanwhile, the setting history to be constantly used is registered in a custom button that makes it easy to understand in what situation the settings are used, whereby the settings to be used can be selected quickly.

In the first exemplary embodiment, upon execution of a job, the CPU 100 displays the setting history of the job in the integrated history 509 on the home screen. Furthermore, it is possible to set the pining of the setting history displayed in the integrated history.

Pinning the setting history displayed in the integrated history makes it possible to prevent the pinned setting history from disappearing from the integrated history 509 and, for the user, to call up similar settings to those of the setting history. Furthermore, by displaying the other setting histories following the pinned setting history, it becomes easier to find the pinned setting history.

In the first exemplary embodiment, at the time of generating the text data indicating the setting values to be displayed as the setting history in the integrated history 509, the text data is acquired for each setting item, and it is determined whether the text data exceeds the upper limit of the displayable length in the setting history. For the setting item of the setting history exceeding the upper limit of the displayable length, the changed setting value is not displayed. However, when the setting value of one setting item becomes long like the address of a transmission job, the setting value of one setting item may exceed the upper limit of the displayable length in the setting history. In this case, no setting value is displayed in the setting history, making it difficult to understand the difference in the setting value between the setting history in which the job has been executed based on the default setting values and the setting history in question.

Therefore, in a second exemplary embodiment, a method for generating and displaying text data up to the limit of length that can be displayed in a setting history will be described.

Figure 16:
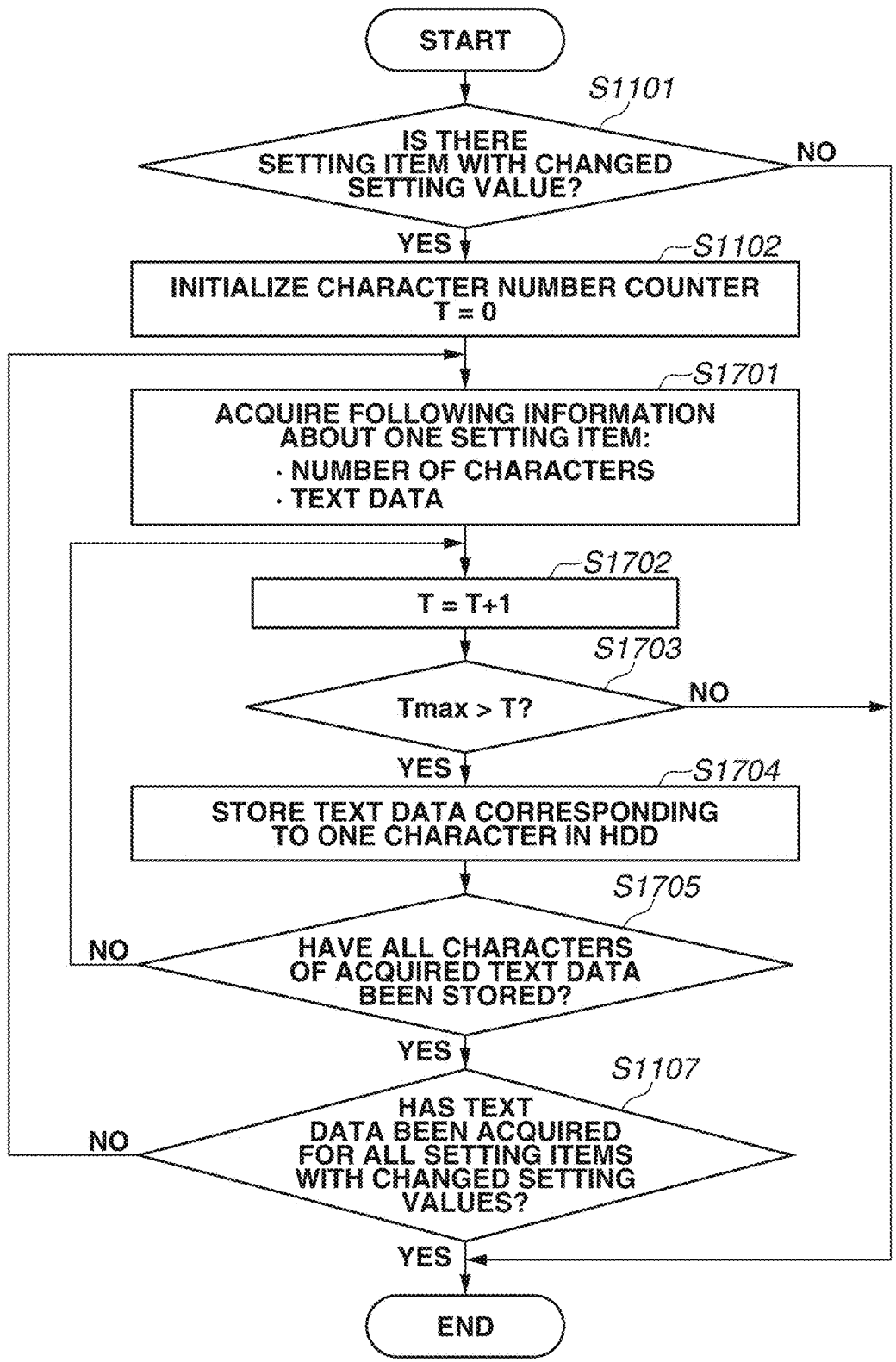
FIG. 16 is a flowchart illustrating processing for generating text of a setting value displayed in a setting history displayed in an integrated history according to a second exemplary embodiment.

FIG. 16 is a flowchart illustrating processing for generating text data indicating setting values of a setting history according to the second exemplary embodiment. A program for executing the processing described in this flowchart is stored in the HDD 103 or the ROM 104, and the processing is implemented by the CPU 100 executing the program.

In FIG. 16, a case where a copy job is executed will be described as an example. Among the pieces of processing described in FIG. 16, the same reference numerals are assigned to the processing similar to that described in FIG. 11, and only different processing will be described.

In step S1701, the CPU 100 acquires the number of characters and text data indicating the setting value of the leftmost setting item in the current settings 803 in the copy data table 800 among the setting items having different setting values between the default settings 802 and the current settings 803 in the copy data table 800. For example, when the copy data table 800 is as illustrated in FIG. 8A, the CPU 100 acquires the number of characters "two characters" and the text data "2 copies" about the setting item "number of copies". "two characters" of t is used at S1705 which will be explained below.

In step S1702, the CPU 100 increments the value of the character number counter T by one. Then, in step S1703, the CPU 100 determines whether the value of the character number counter T is smaller than the upper limit of length Tmax of the text data that can be displayed in the setting history in the integrated history 509.

If the value of the character number counter T is smaller than Tmax (YES in step S1703), the processing proceeds to step S1704. In step S1704, the CPU 100 stores one character in the HDD 103 from the text data acquired in step S1701. For example, in this case, "2" of the text data "2 copies" acquired in step S1701 is stored in the HDD 103 as the text data of the setting value.

In step S1705, the CPU 100 determines whether all the characters of the text data acquired in step S1701 have been stored in the HDD 103. In step S1705, if there is still text data that is not stored in the HDD 103 (NO in step S1705), the processing returns to step S1702 and the CPU 100 performs the processing on the remaining characters.

In step S1703, if the value of the character number counter T is equal to or larger than the maximum number of characters of text data that can be displayed in the setting history (NO in step S1703), the CPU 100 ends the processing described in this flowchart.

According to the second exemplary embodiment, it is possible to display the setting value after being changed by the user up to the limit of length that can be displayed in the setting history, and to display more information in the setting history. In addition, when the setting value of one setting item becomes long, it is possible to prevent the changed setting value from disappearing altogether from the setting history.

Other Exemplary Embodiments

Figure 17:
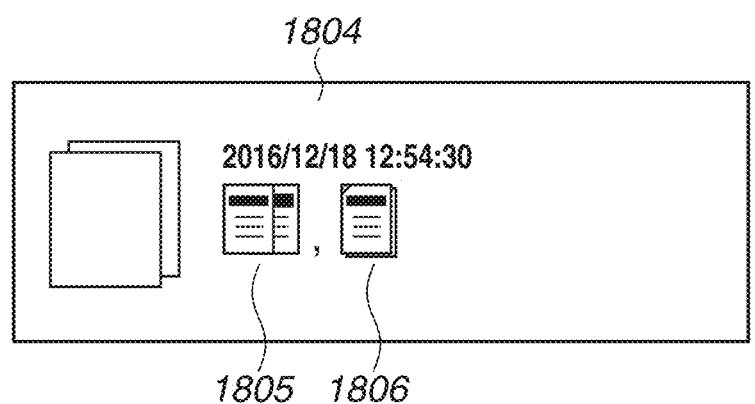
FIG. 17 is a schematic diagram illustrating a setting history in a case where display text of the history is an icon according to other exemplary embodiments.

In the first and second exemplary embodiments, the text data indicating the setting value of the setting item changed from the default settings is displayed in the setting history. The setting item changed from the default settings may be represented by an icon. For example, like a setting history 1804 in FIG. 17, a mixed document setting indicating a plurality of read document sizes and presence/absence of stapling may be indicated by icons 1805 and 1806, respectively. Furthermore, both the text and the icon may be used to indicate the changed setting.

In the first and second exemplary embodiments, only the setting item changed from the default settings is displayed as a changed setting value in the setting history. A predetermined setting item may be displayed, whether changed or not. For example, in a case where it is determined that the setting values of the number of copies, color setting, and single-sided/double-sided setting are displayed in a setting history at the time of using the copy function, the integrated history 509 as illustrated in FIG. 18 is displayed on the touch panel 200. Setting histories 1901 and 1903 to 1905 are all setting histories relating to the copy function. The above setting items are always displayed in any of these setting histories. In addition to the above setting items, the setting values of the setting items changed from the default setting values are also displayed in the setting histories 1903 and 1905.

In the first and second exemplary embodiments, among all the setting items, the setting items changed from the default settings are displayed in the setting history. Only the setting items changed from the default settings among predetermined setting items may be displayed in the setting history.

Figure 19A:
FIGS. 19A and 19B are schematic diagrams of an integrated history in a case of displaying setting items that have been changed from default settings among predetermined setting items according to other exemplary embodiments.

Assume that, for example, a predetermined setting item is a setting item to be set by any application. The setting items to be set by any application include, for example, color setting, single-sided/double-sided setting, density setting, and magnification setting. At this time, the integrated history 509 as illustrated in FIG. 19A is displayed. Here, all of the above setting items have been changed in setting histories 2101 and 2103, while only the single-sided/double-sided setting has been changed in a setting history 2105.

Figure 19B:

Different from FIG. 19A, a setting item specific to each application may be set as a predetermined setting item. For example, in the copy function, the number of copies, the size of a printing sheet, the setting of "N in 1", and presence/absence of stapling are predetermined as setting items, while in the transmission function, the number of addresses, the number of multi-address transmissions, a transmission file format, and the resolution of image data are predetermined setting items. In this case, the integrated history 509 illustrated in FIG. 19B is displayed on the touch panel 200. All of the above predetermined setting items have been changed in setting histories 2107 and 2109. Meanwhile, only the print sheet size among the above predetermined setting items has been changed in a setting history 2111.

Figure 22:
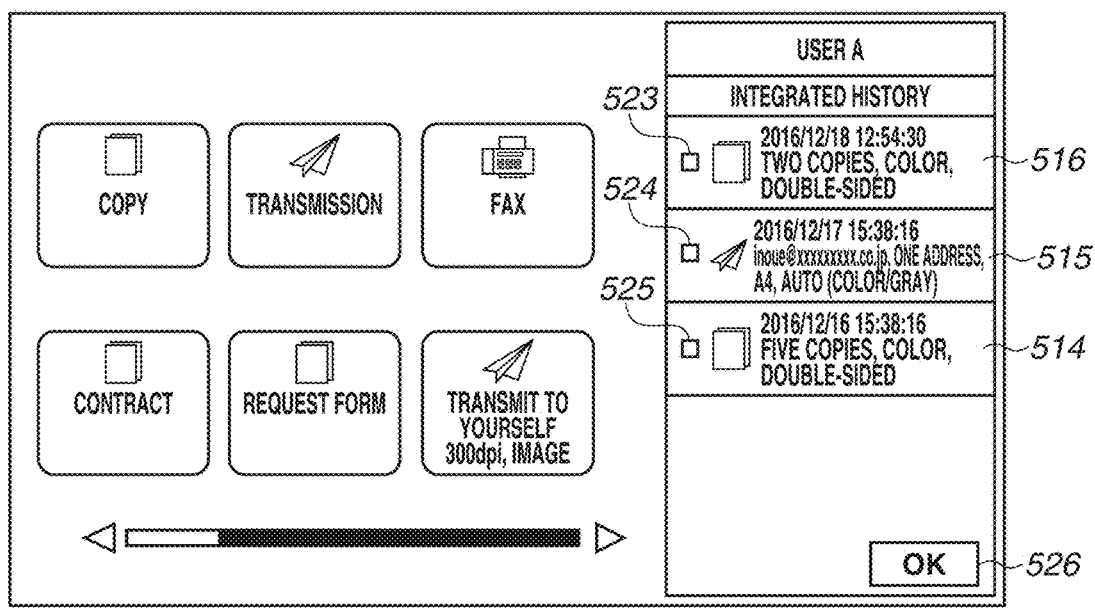
FIG. 22 is a diagram illustrating an example screen displayed in a case where a plurality of setting histories is pinned simultaneously according to other exemplary embodiments.

In the first and second exemplary embodiments, one setting history displayed in the integrated history 509 is selected, and it is determined whether to pin the selected setting history. A plurality of setting histories displayed in the integrated history 509 may be pinned at the same time, or the pinning of the setting histories may be canceled at the same time. For example, a pinning batch setting screen illustrated in FIG. 22 is displayed on the touch panel 200 with a method not illustrated. In the pinning batch setting screen, check boxes 523 to 525 for inputting ON/OFF of the pinning are displayed on the setting histories displayed in the integrated history 509. In the check box of the already pinned setting history, a check mark is displayed from the beginning. As the check boxes 523 to 525 are pressed, the image processing apparatus 1 displays the check marks in the check boxes 523 to 525. Upon detecting the pressing of an "OK" button 526, the image processing apparatus 1 turns on the pinning flag of the setting history in which the check mark is displayed in the check box. In this manner, it is possible to simultaneously pin a plurality of setting histories, or to simultaneously cancel the pinning of a plurality of setting histories.

In the first and second exemplary embodiments, the pinned setting history is displayed above the other setting histories. Alternatively, however, all the setting histories including the pinned setting history may be displayed in reverse chronological order of job execution date and time. This makes it easier to understand between which jobs the pinned setting history has been executed.

The first and second exemplary embodiments have been described assuming that only a predetermined number of setting histories can be displayed in the integrated history 509. The number of setting histories that can be displayed in the integrated history 509 may vary depending on the capacity of a storage apparatus such as the HDD 103 or the ROM 104 of the image processing apparatus 1 or on the contents displayed in each setting history. For example, a plurality of setting histories that fall within a predetermined integrated history display area may be displayed. If the setting history of a newly executed job cannot be displayed in the integrated history display area, the setting history of this executed job is made displayable by not displaying the setting history with the oldest execution date and time among the setting histories displayed in the integrated history display area.

In the first and second exemplary embodiments, the current settings are stored in the HDD 103 upon start of a job. Upon completion of job execution, the settings of the job that has been executed may be stored in the HDD 103 as the current settings. In this case, the date and time when the job is completed may be displayed as the execution date and time of the job.

The present invention can also be implemented by execution of the following processing. Specifically, the processing includes supplying software (program) for implementing the functions of the above-described exemplary embodiments to a system or an apparatus via a network or various storage media, and causing a computer (or a CPU or a micro processing unit (MPU), for example) of the system or the apparatus to read and execute the program. In this case, the computer program and the storage medium storing the computer program constitute the present invention.

The image processing apparatus according to an exemplary embodiment of the present invention can prevent the history of a job that the user wishes to see from disappearing and becoming invisible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. It will of course be understood that this invention has been described above by way of example only, and that modifications of detail can be made within the scope of this invention.

This application claims the benefit of Japanese Patent Application No. 2017-016098, filed Jan. 31, 2017, which is hereby incorporated by reference herein in its entirety.

What is claimed is:

1. An image processing apparatus comprising:
   at least one processor and at least one memory coupled to the at least one processor, the at least one memory having stored thereon instructions, which, when executed by the at least one processor, cause the at least one processor to cooperate to act as:
   a storage unit configured to store histories of jobs;
   a display unit configured to display the histories stored by the storage unit or a part of the histories stored by the storage unit on a display;
   a control unit configured to, in a case where the number of histories displayed by the display unit is a predetermined number, delete at least one of the histories displayed by the display unit from the display in accordance with execution of another job and display a history of the executed another job on the display; and
   a setting unit configured to set such that a history displayed by the display unit is not deleted by the control unit,
   wherein the history set by the setting unit is not deleted from the display even when the another job is executed in a case where the number of histories is the predetermined number.

2. The image processing apparatus according to claim 1, wherein the display unit is configured to display histories of jobs not set by the setting unit in reverse chronological order of an execution date and time of the jobs.

3. The image processing apparatus according to claim 2, wherein the display unit is configured to display the stored histories as a list and to display the history of the job set by the setting unit above the histories of the other jobs.

4. The image processing apparatus according to claim 1, wherein the display unit is configured to display the history of the job set by the setting unit on the display for selecting an application to be used.

5. The image processing apparatus according to claim 1, wherein the control unit is configured to perform control to delete, from the storage unit, the history of the job with an oldest execution date and time among the histories of the jobs.

6. The image processing apparatus according to claim 1, wherein the image processing apparatus is configured to execute a plurality of types of jobs, and wherein the display unit is configured to display histories of the plurality of types of jobs in reverse chronological order of execution of the jobs.

7. The image processing apparatus according to claim 1, wherein the storage unit is configured to store a setting value of a job as a history of the job upon start of the job.

8. The image processing apparatus according to claim 1, wherein the control unit is configured to read the history of a job displayed on the display unit and performs control to set the history as setting values of a job to be executed.

9. The image processing apparatus according to claim 1, wherein the storage unit is configured to store as a job history at least one of a type of an executed job, an execution date and time of the job, and a setting value of the job.

10. The image processing apparatus according to claim 1, wherein the display unit is configured to display at least one of a type of an executed job, an execution date and time of the job, and a setting value of the job.

11. The image processing apparatus according to claim 1, further comprising an identification unit configured to identify a user, wherein the display unit is configured to display the history of the job executed by the user identified by the identification unit.

12. The image processing apparatus according to claim 1, wherein the display unit is configured to display a setting value of a setting item that has been changed from a predetermined setting value among the setting values of the job stored in the storage unit as the history of the job.

13. The image processing apparatus according to claim 1, wherein at least one type of job among a copy job, a print job, a scan job, a fax job, and a transmission job via a network is executable as the job.

14. An image processing apparatus comprising:
a display unit configured to display a history of jobs;
a control unit configured to, in a case where the number of histories displayed by the display unit is a predetermined number, control the display unit not to display at least one of the histories in accordance with execution of another job and to display a history of the another executed job; and
a setting unit configured to set such that a display state of a history displayed by the display unit is maintained,
wherein the display state of the history set by the setting unit is maintained even when the another job is executed in a case where the number of histories is the predetermined number.

15. A method for controlling an image processing apparatus including at least a print function, comprising:
storing histories of jobs in a storage unit;
displaying the histories stored by the storage unit or a part of the histories stored by the storage unit on a display;
performing control to, in a case where the number of histories displayed by the display unit is a predetermined number, delete at least one of the histories displayed by the display unit from the display in accordance with execution of another job and display a history of the executed another job on the display; and
setting such that a history displayed by the display unit is not deleted,
wherein the history set by the setting unit is not deleted from the display even when the another job is executed in a case where the number of histories is the predetermined number.

16. A method for controlling an image processing apparatus including at least a print function and including a display unit configured to display a history of jobs, the method comprising:
controlling the display unit to, in a case where the number of histories displayed by the display unit is a predetermined number, not to display at least one of the histories in accordance with execution of another job and to display a history of the another executed job; and
a setting unit configured to set such that a display state of a history displayed by the display unit is maintained,
wherein the display state of the history set by the setting unit is maintained even when the another job is executed in a case where the number of histories is the predetermined number.

* * * * *